(12) United States Patent
Levis et al.

(10) Patent No.: US 7,624,024 B2
(45) Date of Patent: Nov. 24, 2009

(54) SYSTEMS AND METHODS FOR DYNAMICALLY UPDATING A DISPATCH PLAN

(75) Inventors: Jack Levis, York, PA (US); Douglas K. Mohr, Churchville, MD (US); Ranganath S. Nuggehalli, Pikesville, MD (US); Anthony J. D'Antona, Forest Hill, MD (US); Ping Hu, Owings Mills, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 1017 days.

(21) Appl. No.: 11/108,994

(22) Filed: Apr. 18, 2005

(65) Prior Publication Data

US 2006/0235739 A1  Oct. 19, 2006

(51) Int. Cl.
*G06Q 10/00* (2006.01)
(52) U.S. Cl. .......................................... 705/1
(58) Field of Classification Search ....................... 705/1
See application file for complete search history.

(56) References Cited

U.S. PATENT DOCUMENTS

| | | | | |
|---|---|---|---|---|
| 3,845,289 | A | * | 10/1974 | French ........................ 701/117 |
| 6,154,658 | A | | 11/2000 | Caci |
| 6,201,540 | B1 | * | 3/2001 | Gallup et al. ............... 715/764 |
| 6,381,538 | B1 | * | 4/2002 | Robinson et al. ............ 701/211 |
| 6,405,126 | B1 | * | 6/2002 | Palomo et al. .............. 701/202 |
| 6,701,299 | B2 | | 3/2004 | Kraisser et al. |
| 6,801,850 | B1 | | 10/2004 | Wolfson |
| 6,879,962 | B1 | | 4/2005 | Smith et al. |
| 6,895,329 | B1 | | 5/2005 | Wolfson |
| 2002/0044084 | A1 | * | 4/2002 | Itoh et al. ................. 342/357.1 |
| 2002/0055818 | A1 | * | 5/2002 | Gaspard, II ................. 701/209 |
| 2002/0091486 | A1 | * | 7/2002 | Hubschneider et al. ..... 701/209 |
| 2002/0103728 | A1 | | 8/2002 | Naghshineh et al. |
| 2003/0088507 | A1 | * | 5/2003 | Fisher et al. ................. 705/37 |
| 2003/0101069 | A1 | * | 5/2003 | Sando ........................... 705/1 |
| 2003/0114206 | A1 | | 6/2003 | Timothy et al. |
| 2003/0233188 | A1 | * | 12/2003 | Jones ........................ 701/200 |
| 2004/0004119 | A1 | * | 1/2004 | Baldassari et al. .......... 235/384 |
| 2004/0073356 | A1 | * | 4/2004 | Craine ........................ 701/117 |
| 2004/0117196 | A1 | * | 6/2004 | Brockman et al. ............. 705/1 |
| 2004/0124977 | A1 | * | 7/2004 | Biffar ..................... 340/539.13 |
| 2004/0243299 | A1 | * | 12/2004 | Scaer et al. ................. 701/200 |
| 2004/0243430 | A1 | * | 12/2004 | Horstemeyer .................. 705/1 |
| 2005/0154626 | A1 | * | 7/2005 | Jones ............................ 705/8 |
| 2006/0046732 | A1 | * | 3/2006 | Grossman et al. ........... 455/450 |
| 2006/0090160 | A1 | * | 4/2006 | Forsythe et al. ............. 718/100 |

OTHER PUBLICATIONS

Hendee, David, and Thompson, Jake, "1 Inspector, 3 Plants, 12 Hours," Omaha World-Herald, Sunrise Edition, Omaha, Nebraska, Dec. 16, 1997, p. 11.*
M2 Presswire, "Hand Held Products: WH Smith News Aims for 100% De Delivery Accuracy With New Tracking System," Jul. 19, 1999.*
International Search Report for PCT/US06/14344 dated Mar. 7, 2007.
Deb Navas, Low-Cost Cellular Devices and Networks are Transforming Wireless Wide-Area Network Applications, Article, Jul. 15, 2005, pp. 1-5, Supply Chain Systems.

* cited by examiner

*Primary Examiner*—Igor N Borissov
*Assistant Examiner*—Nathan Erb
(74) *Attorney, Agent, or Firm*—Alston & Bird LLP

(57) ABSTRACT

Systems and methods are disclosed for receiving inputs at a portable computer used by personal typically operating a delivery vehicle providing delivery services, where the inputs potentially impact completion of a pre-established dispatch plan according to certain delivery criteria. The inputs include modifications to the manifest, updates regarding weather or traffic conditions, or other factors impacting the remaining deliveries. The inputs are examined to determine if modification of the original dispatch plan are warranted, and if so, a signal is generated triggering the processing of the original dispatch plan to produce an updated dispatch plan meeting the certain delivery criteria. The certain delivery criteria may involve commitments for completing deliveries by certain time frames.

11 Claims, 17 Drawing Sheets

SYSTEMS AND METHODS FOR DYNAMICALLY UPDATING A DISPATCH PLAN

FIELD OF THE INVENTION

The present invention relates generally to determining when to initiate by a portable computer the updating of a dispatch plan for service stops involving a service vehicle on a route, wherein the updating can be of various forms and is triggered by processing various types of inputs. In one embodiment, the service provided is the delivery of packages.

BACKGROUND OF THE INVENTION

A logistics challenge in the package delivery industry, as well as other industries dispatching service personnel to various locations, is the ability to provide the driver with current, accurate, and efficient instructions to complete the work on a given day. Companies with fleets of vehicles spend vast amounts of time and money to develop dispatch plans allowing a driver to efficiently cover as much territory in as little time as possible. For daily delivery services in which the route can vary on a daily basis (e.g., a vending machine service route, or courier service), the dispatch plan and route used by a driver on a given day is typically developed during the previous day, or at the latest, at the beginning of the work day. The work assigned to the driver is often based on a statistical or heuristic analysis of the amount of work that the driver can perform based on previous historical average delivery volumes.

The number of service stops on a given route is typically based on monitoring the driver's average workload during past work days. Using a basic route plan, a dispatch plan or delivery schedule is derived using the planned deliveries or service stops required to be completed for that day. Any changes to the dispatch plan (e.g., adding or deleting service stops) may impact the route traveled and may not be easily or efficiently accommodated. While experienced drivers familiar with a given route may heuristically adapt to some real-time changes to the dispatch plan, other real-time changes occurring during the work day cannot be effectively accommodated by an experienced driver, much less a driver that is not experienced with the route.

Another aspect complicating the delivery processes is the development of premium service levels and/or delivery commitment time guarantees. Many service providers offer a premium service level associated with a guaranteed service commitment time (also referred to as "service commitment", "service guarantees"). These commitments require that delivery of a package will be completed by a certain time or within a specified time window. Service guarantees complicate creating or modifying a dispatch plan since they requires allocating the work along a route and accounting for individual package delivery commitments on that route. Not surprisingly, service personnel may fail to identify a package as having a commit time until after the guaranteed time of delivery has passed. In other cases, drivers may break from their planned route to satisfy a service delivery commitment, but this can create inefficiencies associated with completion of other deliveries.

These issues are not unique to package delivery services, but apply to performing other services, such as dispatching personnel for repair, installation, sales, or site inspection. Typically, a customer is provided with a time window to expect a service call. The customer desires a narrow time window for expecting service personnel to arrive whereas the service provider desires a wide time window to provide flexibility for the service personnel. In other instances, customers may have blanket restrictions as to when services can or cannot be provided. For example, some customers may restrict the times during which deliveries are accepted or services can be provided.

Further, execution of a dispatch plan can be impacted by mundane events, such as the weather, road conditions, and mechanical breakdowns of the service vehicle. Any of these events, individually or in combination, can impact the execution of the dispatch plan and cause delivery commitments to be missed, or at least, decrease efficiency because the dispatch plan, as originally determined, did not (and could not) take into account the occurrence of the event. For example, a road closure or traffic accident can cause the driver to inefficiently alter the route of the service vehicle with respect to the dispatch plan. While a driver familiar with a particular serving area may be able to heuristically alter their route based on personal knowledge, such ad-hoc deviations may not provide an optimal solution. Even an experienced driver, but one not yet familiar with a given route, cannot be expected to employ such ad-hoc deviations to ensure that all delivery commitments are met under exceptional circumstances.

Therefore, an unsatisfied need exists in the service industry for improved systems and methods of providing drivers with tools that update a dispatch plan upon detection on various types of conditions.

BRIEF SUMMARY OF THE INVENTION

The invention generally pertains systems and methods of using a portable computing device that stores, processes, and updates a dispatch plan. The dispatch plan can be viewed as a logical series of records, in which each record represents a service stop, and each service stop is associated with performing a service, such as the delivery of a package. The portable computer is capable of receiving input messages comprising update data, which is typically wirelessly transmitted to the portable computing device. The update data can be in various forms, including data affecting the contents of the dispatch plan, such as adding new records, deleting records, or modifying the contents of a record. Such information potentially results in adding a service stop to the dispatch plan, deleting a service stop, or altering actions to be performed at a service stop. Other forms of data affecting the dispatch plan include receiving traffic and/or weather related data pertaining to the service area associated with the dispatch plan. Still other forms of data include periodic time and location inputs that are used to determine a relative performance of the dispatch plan according to an anticipated schedule.

The portable computing device processes the input data to determine if there is an impact to the performance of the dispatch plan, and potentially updates the dispatch plan as appropriate, including potentially re-ordering the sequence of records to ensure that any yet-to-be-performed service commitments can be met based on the current schedule status. The schedule status can be determined in a variety of ways, including based on examination of the current location and/or time with an expected location and/or time based on the degree of completion of the dispatch plan.

Once the portable computing device has processed the input data, various results can be presented to the user, including the input data received, its impact on the dispatch plan, and/or potential alternatives for executing the dispatch plan. The results can be presented to the user as an aid in completing the services, in various forms, including a text based tabular format as well as a graphical map-based format. In the graphical-map based format, various locations can be plotted, such as those associated with the various service stops indicated in the dispatch plan.

The above summary indicates only a subset of the aspects of the invention and are not intended to limit the scope of the claims in any way.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
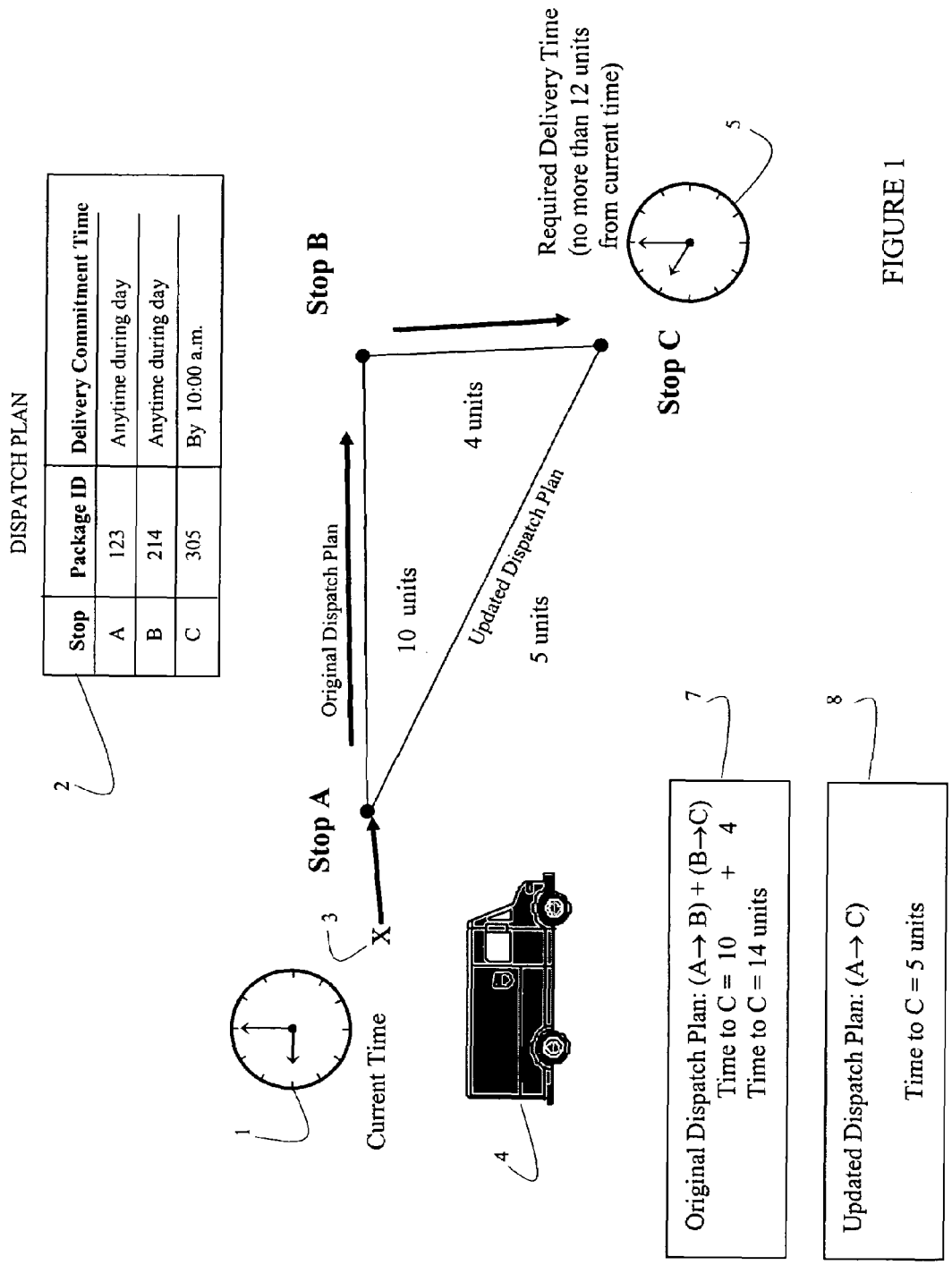
FIG. 1 illustrates one embodiment of a modification to a dispatch plan to ensure a delivery commitment is met.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The present invention is described below with reference to block diagrams and flowchart illustrations of the methods, systems, and computer programs according to an embodiment of the invention. It will be understood that each block of the block diagrams and flowchart illustrations can be implemented by computer program instructions. These computer program instructions may be loaded onto a general purpose computer, special purpose portable computer, a personal digital assistant (PDA), or other programmable data processing apparatus to produce a machine, such that the instructions which execute on the computer or other programmable data processing apparatus, create the means for implementing the functions specified in the system or flowchart blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The computer may be a portable computing device such as those known in the art of delivery services. One embodiment is known as a Delivery Information Acquisition Device (DIAD) and used by UPS, the assignee of the present invention and are carried by UPS drivers, in part, to manage package delivery related data. Further information regarding the functions of the DIAD can be found in U.S. Patent Application Publication, US 2003/0114206, published on Jun. 19, 2003 (application Ser. No. 10/227,147), entitled Portable Data Acquisition and Management System and Associated Device and Method, the contents of which are incorporated by reference herein. Information about specific packages to be delivered, as well as other information such as packages to be picked up, are stored in the DIAD by uploading a manifest at the beginning of a day. The DIAD offers a flexible means to communicate, and various embodiments may employ different technologies for communicating with different entities based on location, usage, or type of information to be conveyed (e.g., wireline-based communication, infrared communication, and/or radio communication means). However, a variety of other types of portable computing devices can be used, including laptops. Furthermore, the computing devices may present the results associated with the dispatch plan to the user in a variety of ways, including text-based information or graphical displays.

A typical package delivery service involves stopping at various locations on a route within a certain serving area and providing services at each stop. Each service stop typically involves delivery of one or more packages, as well as picking up one or more packages. Each service stop (also simply references as a "stop") is typically planned as a one of a sequence of stops along a predetermined route. The sequence of stops along the route is called herein a dispatch plan. The sequence can be presented to the user in tabular or graphical form, as will be seen. In many instances, the geographical serving area is typically static to a degree; i.e., it generally involves the same roads within a geographical area, although not all roads are necessarily traveled on a given day, since not every location on each road is typically associated with a service stop. In other instances, the serving area may alter in area (increase or decrease in size) based on the overall required deliveries in the dispatch plan. Thus, the actual route (e.g., the series of roads) traversed by a service vehicle can vary based on a particular day's work load or based on seasonal changes. Using a generally static route allows drivers to become familiar with the route and gain experience with typical driving times and other conditions and provides a baseline from which deviations can be referenced. While the route traversed or serving area may be static, the particular service stops scheduled along the route on a given day usually varies. The dispatch plan is typically determined based on the packages to be delivered ("deliveries"), packages to be picked up ("pick-ups"), or both. The dispatch plan is typically provided to the driver, either in a paper format or electronically communicated to the portable computing device (e.g., the DIAD), which can be accessed as needed by the driver. Of course, applications involving other services other than package delivery are possible and the principles of the present invention can be readily adapted for such.

Thus, the dispatch plan for a given vehicle is typically determined prior to the start of the day's deliveries based on the packages to be delivered. In some instances, information regarding package pickup may not be loaded into the DIAD prior to the departure of the delivery vehicle because it is not known at the beginning of the day. Alternatively, information about additional deliveries may be provided after deliveries have started (in such cases, the additional packages to be delivered may be received by the driver at a drop location). In other instances, service requests from customers may be received too late to be loaded into the DIAD prior to the start of the day's service stops. In the past, if the driver was not informed about a new stop prior to departure, then this may have required the customer to wait until the next business day for pickup.

While it is always possible that service requests from customers may arrive too late to be performed that work day, the use of wireless communications is readily available in most urban and rural areas and has been used to provide notification of unscheduled service stops (e.g., this has been done via cellular telephones or private dispatch radio). It is possible to remotely notify the driver of the delivery vehicle (or the remote portable computer, as may be the case) en route regarding a modification to the day's dispatch plan. In many situations, an unplanned service stop can be accommodated, allowing a package to be picked up, rather than scheduling the pickup for the next work day.

The addition of an unscheduled service stop consumes a finite amount of time, and the time required for several such unscheduled stops can cause a delay for those service stops not yet performed, and thus jeopardizing service commitments of the other service stops.

One context illustrating the application of the present invention is shown in FIG. 1. In FIG. 1, a delivery route comprising three stops is shown. Assume that normally the route is defined in the sequential order of Stop A, Stop B, and then Stop C. This sequence of service stops is shown in a delivery schedule—the Dispatch Plan 2. The Dispatch Plan 2 is typically embodied as a database having a record corresponding to each stop, and each record indicates a package identifier ("package ID") for one package to be delivered at each stop. The package identifier allows the driver and the portable computer to uniquely identify the particular package or related information associated with it. Thus, a record can be identified in the Dispatch Plan by a computer using the package identifier and the package identifier is also printed on the package (both in human-readable form, and machine readable form). Although not every potential service stop always has a package delivery (e.g., some service stops could be a package pickup), for purposes of illustration, FIG. 1 illustrates one package to be delivered at each service stop, with no package pick ups at any of the three locations. Finally, the Dispatch Plan of table 2 indicates that one package, destined for Stop C, must be delivered by 10:00 a.m.

In FIG. 1, the service delivery vehicle 4 is shown at a given location "X" 3 at a current time 1, which is 9:00 a.m. Arbitrary work or cost units can be assigned to the path between the various stops from the current location. These units could represent driving time, distances, or some other work-related metric. It is well known in industrial engineering to collect historical data for quantifying work units for time and motion studies. In this illustration, it is assumed that each work unit corresponds to a five minute time period. Thus, if the delivery vehicle is at Stop A at 9:00 a.m., there are twelve periods of five minutes from the current time of 9:00 a.m. to 10:00 a.m. The regularly scheduled route from Stop A to Stop B typically consumes 10 units, and 4 units are consumed traveling from Stop B to Stop C. The total time (14 units) exceeds the 12 unit limit and using the route indicated in the Dispatch Plan 2 is likely to result in failing to meet the service commitment require with Stop C. On the other hand, altering the route to proceed first from Stop A to Stop C consumes only 5 units, and using this route results in meeting the service commitment delivery time. Since there are no similar guaranteed delivery times for the deliveries for Stop A and Stop B, the selection of the alternative route does not impact the delivery times (i.e., service commitments) associated for those stops.

Typically, the dispatch plan is prepared in advance with the expectation that the service commitments are met. For example, in the above illustration, the original route indicated in original dispatch plan may have resulted in delivery by the required time based on past time measurements. Specifically, if past delivery data indicates that the vehicle typically arrives at Stop A at 8:00 a.m., then this would allow sufficient time for delivery of the package at Stop C within the required time based on historical travel times. However, unforeseen circumstances for that particular work day may cause the delivery vehicle to arrive at Stop A later than normal. Because the delivery vehicle arrives at Stop A at 9:00 a.m., it is only by altering the route that the committed service level can be met.

The above example illustrates a simple problem wherein the solution is to dynamically alter the original dispatch plan to meet a service commitment. For relatively simple problems, solutions can be heuristically arrived at by an experienced driver familiar with the route using expected travel times and the current day's dispatch plan. In the above illustration, the number of service stops is limited, the number of packages is limited, only one package has a service commitment guarantee, and information is known about alternative routes and their relative work units required. In reality, additional constraints are often imposed. For example, many business locations limit deliveries to certain times of the day. Many restaurants catering to lunch time crowds require their employees to be engaged in serving customers from 11:00 a.m. to 2:00 p.m. and do not accept deliveries during this time frame. Thus, certain stops may have certain time frames in which no deliveries can be made. In other instances, the consignee may prefer delivery/pickup at a certain time frame, but will accept the delivery/pickup at some other time as opposed to deferring the activity to the next business day. Many other constraints and exceptional conditions can occur.

It is apparent that there are many factors involved in determining whether the delivery requirements of a dispatch plan may be successfully fulfilled and whether modification of the dispatch plan is required. Further, it is apparent that in dispatch plans involving either an inexperienced service personnel, or a substitute driver not familiar with the specific route, delivery requirements could be easily missed. Another factor impacting the execution of the dispatch plan is when the unexpected event occurs relative to completion of the dispatch plan or the service commitment times. If the execution of the plan is almost complete (e.g., 2 stops remaining), then determining the impact and/or modification of the dispatch plan may be trivial. However, if the execution of the dispatch plan has just started (e.g., 120 stops remain), then analyzing the impact and modification to the plan is much more complicated.

In the above example, the number of scheduled service stops for a given day is static, even though it may not be the most efficient performance of the plan. For example, one approach for servicing locations having potential package pick-ups is to have the service vehicle stop at each business location where a pickup potentially can occur. While this is a deterministic plan and facilitates a planned schedule, it is inefficient if there are no packages to be picked up at the location and there are no scheduled package deliveries warranting a stop. In this case, an unnecessary service stop occurred. Some of the ad-hoc solutions, such as placing a visual indicator visible to the driver indicating whether a stop is required, may not always be practical, reliable or efficient.

Many customers now employ shipping systems that communicate shipping information associated with packages to be picked up, so that the carrier knows beforehand if a package pickup is required, as well as the package level details (PLD) associated with the package. The use of shipping systems facilitates package pickup because the carrier knows when a pickup is required and the service vehicle is only required to stop for a package pick-up at locations where packages are actually waiting. One such shipping system is disclosed in European Patent Specification, EP 0 829 057, entitled Method and System for Preparing An Electronic Records For Shipping A Parcel.

Figure 2:
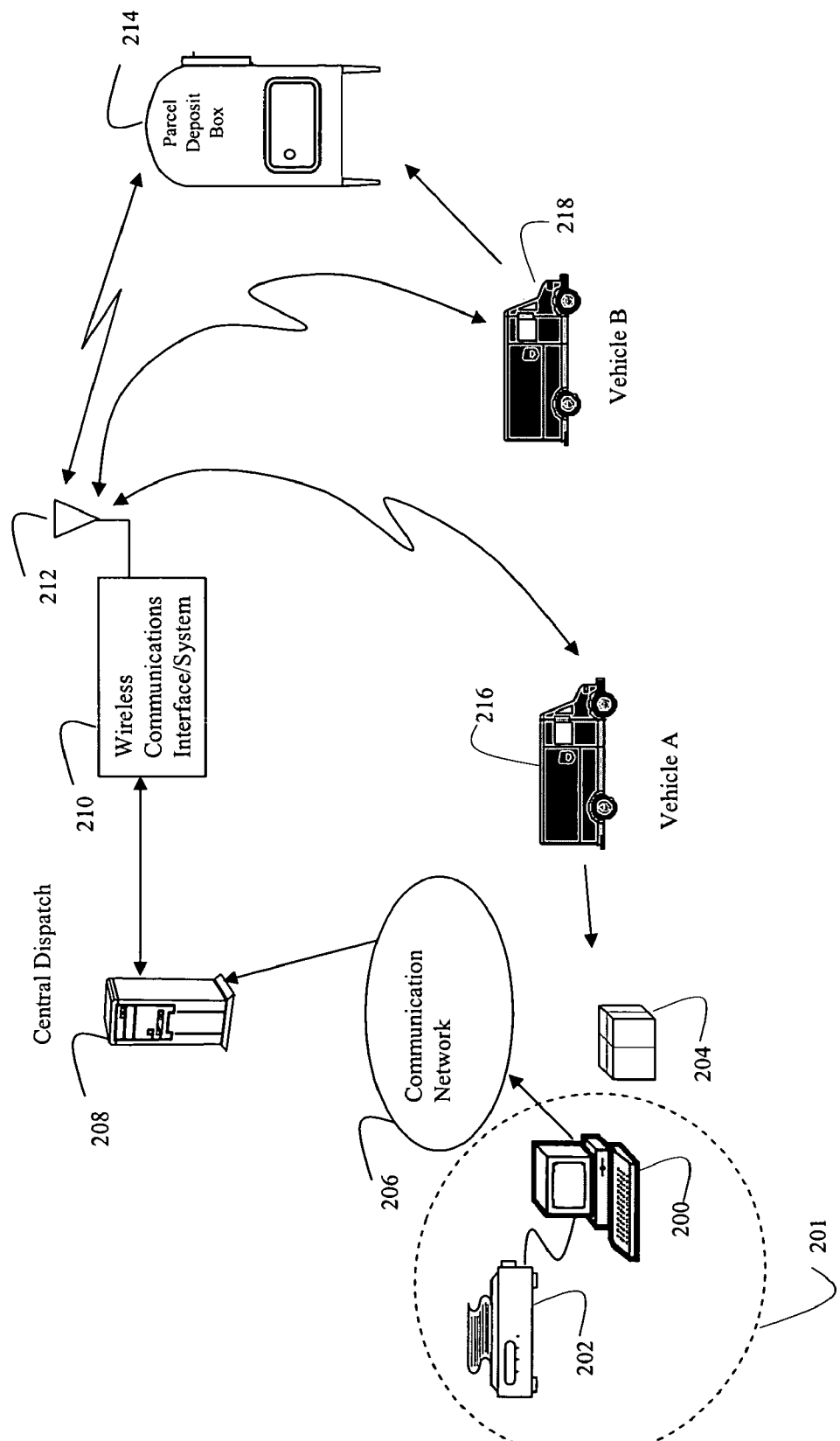
FIG. 2 illustrates one embodiment of another process involving with communication flows associated with modification to a dispatch plan.

Employing such shipping systems in conjunction with wireless communication to portable computers carried by service personal (e.g., the DIAD) or integrated into the delivery vehicles allows remote updating of the dispatch plan for package pick-up, even after the delivery vehicles have departed for the day's deliveries. For example, turning to FIG. 2, a shipping system 201 might comprise a personal computer 200 and a locally attached printer 202 allowing a customer to input shipping data and print labels for a package 204 to be picked up. The computer 200 has connectivity to a communications network 206, such as the Internet, or other well-known communication networks, allowing a request for a package pickup to be transmitted to a central dispatch system 208. The central dispatch system 208 determines the geographical origin of the service stop and selects one of several delivery vehicles 216, 218 based on each vehicle's serving area and/or current location. In FIG. 2, the central dispatch system 208 determines that Vehicle A 216 is the most appropriate vehicle. Using a wireless communications service 210 results in a wireless message transmitted by an antenna 212 to the appropriate DIAD carried by the vehicle's driver. The central dispatch system 208 may determine the appropriate vehicle by comparing the pickup location with a map of each delivery vehicle's service area or querying the exact location of each DIAD. The pickup location is preferably identified by a location address indicated by the shipping system 200, but other methods can be used. For example, if the customer telephones in a request by speaking to a customer service agent (not shown), the calling party number of the caller could be used to determine a geographical location, which in turn can be compared to a map to determine the appropriate delivery vehicle. Alternatively, the customer service agent may enter the pickup location using a computer that provides the address to the dispatch computer 208. Thus, in this scenario, the number of scheduled service stops may increase or decrease during the time the original dispatch plan is being performed.

In various embodiments, the portable computer may be carried by the vehicle driver, or the portable computer can be incorporated into the vehicle. Thus, sending a message to a service vehicle to schedule a pickup as stated herein is not necessarily limited to using a DIAD-like device; the computer could be integrated into the vehicle. Other embodiments may utilize both a portable computer and a vehicle integrated unit operating in coordination. Thus, when stated herein that a message is sent from central dispatch to the delivery vehicle, the information may actually be conveyed to the portable computer carried by the driver of the delivery vehicle. Thus, in various contexts, some flexibility may be required in interpreting the specification herein. For example, if the location of the vehicle is recorded or reported, it can be assumed that a GPS device in the DIAD carried by the driver on their person is sufficient for approximating the location of the vehicle. Similarly, stating that a message is sent to a DIAD-like portable computer carried by the driver, does not preclude embodiments using an integrated computer in the vehicle.

Further, although the vehicle being dispatched is typically referred to as a "delivery vehicle", "service vehicle", or "package delivery vehicle", this term should not be viewed as limited to automotive-based vehicles, nor as a vehicle being used only for deliveries. Rather, these terms can be viewed as applicable to any type of conveyance of a good to completing the performance of a service. Thus, this would encompass aircraft, boats, trains, buses, cargo vans, trucks, motorcycles, tractor trailers, etc. capable of conveying a person for inspecting a premise, fixing or replacing a device, etc.

The wireless communications can be based on private point-to-point mobile radio, as used by some dispatch services, or the wireless communication could be based on a common carrier wireless service, such one of the well known digital cellular, digital data, or satellite-based communication services (including, but not limited to EDGE, GPRS, CDMA2000 1x-RTT, Short Message Service, MMDS, other types of 3G data services, etc.). The present invention can be based on a variety of forms of wireless communication technologies. Further information may be found in the aforementioned patent application incorporated by reference.

Figure 15:
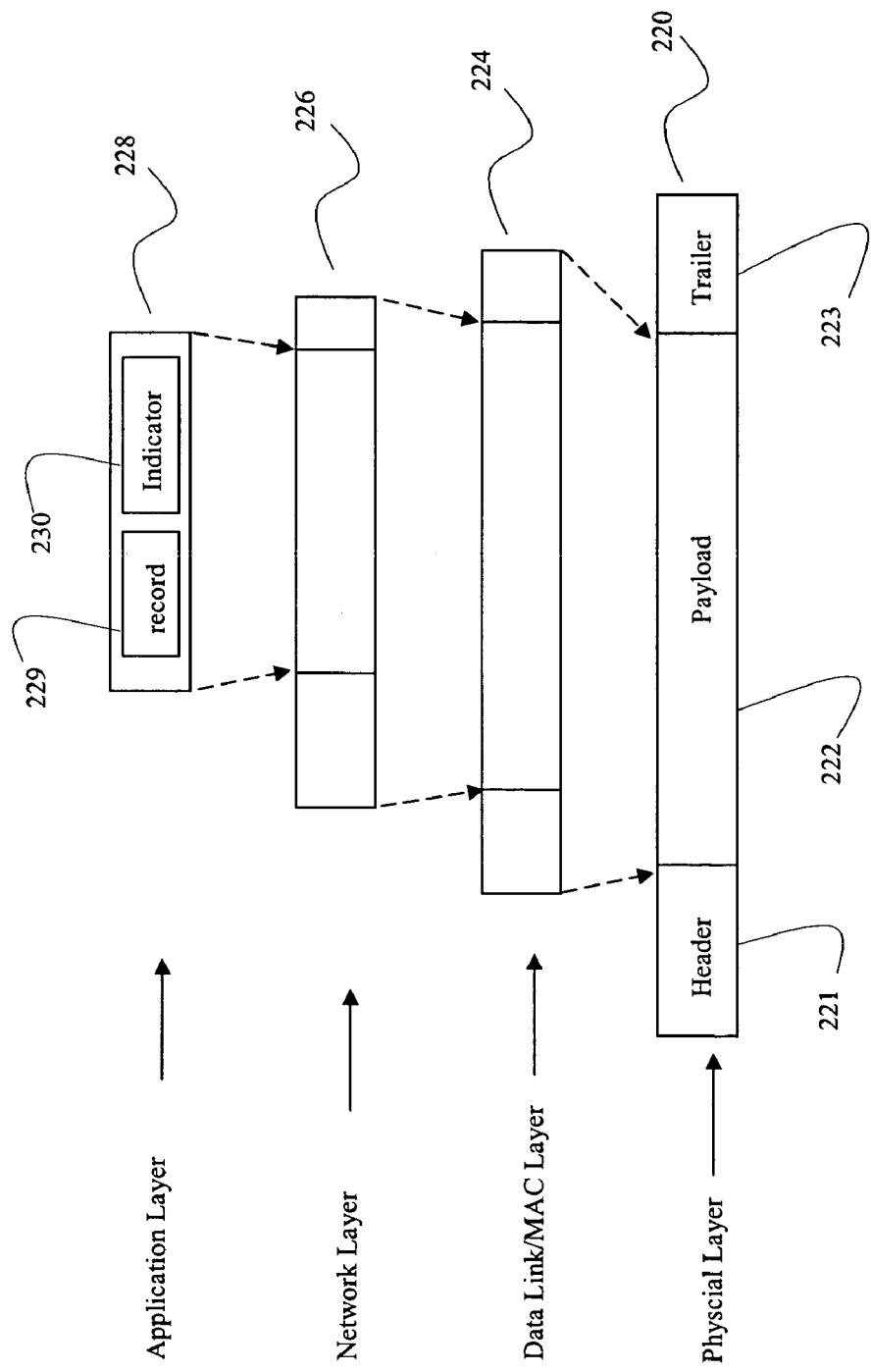
FIG. 15 illustrates one embodiment of messages that may be conveyed wirelessly to the portable computing device.

The format of the wireless communication can vary, and FIG. 15 illustrates one typical protocol structure that can be used. In FIG. 15, a protocol data unit (PDU) is a typical format for conveying digital information. A PDU is typically associated with a particular layer of communication, and typically comprises a header 221, payload 222, and a trailer 223. The physical protocol data unit 220 conveys information using a particular radio modulation protocol. The physical layer PDU conveys a link layer (typically a combined link layer and Media Access Control ("MAC") layer) 224, which in turn, conveys a network layer protocol data unit 226. Each of these has a similar format of a header, payload and trailer and various types are well known in the art of wireless communications. Finally, an application layer PDU 228 is conveyed (although other intervening protocol layers may be present). The application layer PDU transfers the data pertinent to the dispatch plan, or any other information exchanged between the portable computer device (e.g., the DIAD) and a central dispatch system. The format of the application layer PDU can be proprietary. Illustrated in FIG. 15 is a field conveying a record 229 associated with a dispatch plan and an indicator 230 indicating an action to be performed. For example, if an additional record is to be added to the dispatch plan (e.g., representing another service stop for a package pickup), the record to be added could be conveyed by the application layer PDU along with an indicator of what operation is to be performed (e.g., "add record"). Further fields and functions can be defined, such as modifying a record, deleting a records, etc. Those skilled in the art of protocol and service design will readily identify various ways in which the information and invocation of functions can be conveyed between the portable computing device and the dispatch server. Typically, existing communication protocols can be used for the lower layers, while application specific protocols can be easily designed to convey dispatch plan related information.

The communication signaling a parcel pickup may involve entities other than shipping systems or central dispatch systems. In FIG. 2, an intelligent parcel deposit box 214 is disclosed. This type of parcel deposit box allows customers to deposit parcels for pickup, rather than requiring the delivery vehicle stop at a business location where the package originated from. The deposit boxes are typically placed in convenient and visible locations, along the route typically traversed by the service vehicle. The intelligent parcel deposit box 214 could have appropriate sensors detecting when a parcel is deposited, and provide the wireless notification of such to the central dispatch system 208 using the wireless communication system 210. Similarly, the central dispatch system 208 can determine the appropriate vehicle to service the deposit box and notifies that vehicle when a service stop is required. In FIG. 2, Vehicle B 218 is notified to stop by and pick up the package in the deposit box. This scheme avoids the need for the driver to stop by the deposit box to determine if the box contains a package, when in actuality, it is empty.

Regardless of the circumstances in which additional packages are assigned to a vehicle during the delivery time period, the central dispatch system may select the vehicle to handle those packages based on the geographic location of the pickup in relation to the current serving area for each delivery vehicle or based on which delivery vehicle is best suited to serve the request taking into account the location, workload, or other factors associated with the vehicle. For example, in FIG. 2, Vehicle A 216 may be selected because it serves the geographical area in which the package 204 is located. Alternatively, Vehicle A may be the second closest vehicle, but it is selected because Vehicle B may have delivery commitments that would be jeopardized if it were assigned to pickup the package. Regardless of how the target vehicle is selected, the central dispatch system 208 transmits wirelessly the updated information to the appropriate dispatch vehicle.

In practice, other types of information can impact execution of a dispatch plan and fulfillment of delivery commitments. Determining a potential impact preventing fulfillment of the future execution of the dispatch plan can be termed: a "jeopardy", "jeopardy situation", a "service commitment jeopardy", or a "schedule jeopardy" (other similar terms may be used). If a jeopardy situation is determined, the processor in the portable computing device may analyze the remaining service stops to be performed and determine if reordering is appropriate to optimize the remaining services stops in order to meet the commitment. As noted, no examination is required for service stops already performed. Some of the more common types of inputs impacting a dispatch schedule and triggering updating of the original dispatch plan are described below.

Manifests and Dispatch Plans

A manifest is typically defined as a list of cargo to be delivered. In this embodiment, cargo comprises packages for delivery, although the principles of the present invention apply to delivery of other types of goods, including parcels, letters, parts, baggage, etc. Further, the present invention can apply to rending services by service personnel that are dispatched to defined locations. Thus, although the "manifest" is discussed in terms of items that are delivered, in other contexts, the term "manifest" could be broadly construed as listing work actions to be performed. The manifest typically is a "delivery manifest," i.e., a list of packages for delivery, and typically includes related information about the package. However, the manifest can also include information of packages that are to be picked up. This situation can be distinguished by describing the manifest as a "pickup manifest." When used without qualification herein, the manifest can be broadly construed to contain information pertaining to goods that are scheduled for either pick-up, delivery, or requiring some other specific action.

If the manifest is sequenced to represent an order in which to perform the work, then it can be referred to as a Dispatch Plan. Alternatively, a Dispatch Plan can be a separate set of information derived from the manifest. Generally, a Dispatch Plan is conceptually viewed as an ordered sequence of the manifest, but as will be seen, there are different ways for storing and structuring a manifest and Dispatch Plan using a database and the logical representation of the data does not be interpreted as requiring a certain implementation or data structures.

Delivery Manifest Updates

Typically, a package delivery vehicle begins a route by being loaded with the packages at a central sorting facility with the packages for the day's delivery. The driver is provided with a copy of the Dispatch Plan that is downloaded into the DIAD (again, the Dispatch Plan can be considered as an ordered sequence of the manifest), including information about deliveries, pickups, or other service related information. The Dispatch Plan information typically includes the consignee (destination address) and associated package service levels and/or delivery commitment times ("delivery commitments"). Each group of information associated with a service stop, delivery, or other service action, can be considered a record in a database. Thus, the Dispatch Plan can be viewed as comprising a sequence of records. Further, each record could include additional information regarding customer specific requirements—e.g., certain delivery time windows, directions to the location, preferred delivery locations, names of shipping clerks, etc. In other embodiments, an update to the Dispatch Plan may reflect a customer's desire to redirect the package to an alternative location, such as a retail location affiliated with the carrier. Related information can be found in a co-pending patent application entitled, Manifest Generation and Download Systems and Methods, U.S. patent application Ser. No. 10/745,468, filed on Dec. 22, 2003, and Portable Data Acquisition and Management System and Associated Device and Method, U.S. patent application Ser. No. 10/227,147, filed on Aug. 23, 2002, the contents of which are incorporated by reference into the present application.

In the past, the manifest data or dispatch plan for a given day's work activities were not modified once provided to the driver. However, as discussed in conjunction with in FIG. 2, new technology allows updating the Dispatch Plan after the vehicle has begun servicing the route. In addition to remotely updating the Dispatch Plan, the Dispatch Plan information could be modified locally by the driver or some other local computing device. For example, additional items could be added for delivery by the driver stopping at a second loading location and receiving additional packages for delivery. The information could be manually entered or received from a point-to-point connection with another local computer or DIAD. Using a secondary loading location is useful if there is limited room on the delivery vehicle, such that all deliveries for the day cannot be carried in one load by the delivery vehicle. Alternatively, the vehicle may receive packages en route by transferring packages from a second delivery vehicle. This may occur if the second delivery vehicle has broken down and requires off-loading the packages, or when packages are transferred in order to equalize the load between the two vehicles. Such situations are common during certain peak shipping times of the season (e.g., holiday season deliveries).

Pickup Dispatch Plan Updates

A pickup Dispatch Plan can be viewed as a manifest of items to be picked up, which is ordered so as to represent the sequence in which the pick ups are to be done. Once ordered, it can be viewed as a Pickup Dispatch Plan. A pickup dispatch plan can be modified in several ways, including using the aforementioned methods of wireless communication. Some of the modifications to the pickup dispatch plan may trigger a need to reexamine and potentially alter the sequence of service stops, whereas other modifications to the Dispatch Plan may not. One example of a change to the manifest that does not alter the order of subsequent deliveries is when a customer alters the class of service for a package being picked up. For example, assume a package pickup is originally indicated with a two-day delivery class of service, but the class of service is changed to regular ground delivery. While subsequent handling of the package at a central sorting facility may be altered, the dispatch plan for the vehicle picking up the package is typically not impacted by the change in service level. The delivery vehicle still must make a service stop at the location to pick up the package and there is no need to alter order of the subsequent pick-ups.

There are other examples of changes to the dispatch plan that do not impact the execution or performance of the dispatch plan; i.e., the changes do not adversely impact the schedule of subsequent service stops. For example, a customer canceling a package pickup alters the dispatch plan in that the vehicle may not be required to stop at that location (assuming there are no deliveries to that location), but this type of change does not impose additional time requirements on the driver. Similarly, reducing the number of packages to be picked up does not impose addition time requirements. If anything, such changes result in the execution of the schedule to be advanced relative to the original schedule.

However, other changes to the pickup dispatch plan may impact subsequent work activities. For example, if a customer increases the number of packages for pickup, particularly if the increased number s significant, then the additional time required by the driver may impact the schedule for the remainder of the day. Further, loading additional packages into the vehicle may present space problems, impact the organization of packages, and add time required by the driver to sort and find the other packages for subsequent delivery.

Another possible modification to the pickup dispatch plan is adding a pickup at a previously unscheduled location. This reflects a common situation when a customer who was not able to prepare the package for pickup in time for the information to be incorporated into the dispatch plan downloaded into the portable computer. However, such information can be provided to the DIAD after the service vehicle has been dispatched using the aforementioned wireless communication. This requires a modification to the work schedule (e.g., the schedule service stops) in order to pickup the package. This type of modification to the work schedule always impacts the work schedule by requiring additional time by the driver, although the addition time required for a pickup may be minimal if a delivery is already scheduled to occur. Some carriers may arrange pickups to occur after deliveries, so as to avoid delaying the deliveries and to provide room in the vehicle for the packages to be picked up.

Miscellaneous Events

Finally, there are other possible unforeseen factors impacting the schedule of service stops. For example, the driver may notice after a pickup has occurred, that a package must be returned to the customer (e.g., it has been damaged, improperly packaged or labeled, it is leaking hazardous liquids, etc.). This may require the driver to amend the pickup manifest to reflect the return of a package or special handling. Those experienced in the delivery of goods will no doubt recognize that other types of exceptions and modifications to the dispatch plan can occur.

Weather Updates

Weather conditions typically impact performance of a dispatch plan. Inclement weather, such as rain or snow storms, generally impedes traffic and can be expected to add delay to the schedule. While weather forecasting is a well-known science, pinpoint forecasting is not yet reliable enough to predict at the beginning of the day exactly what the weather will be later in the day along a delivery route. Unexpectedly severe weather conditions can affect portions of a route and adversely impact delivery schedules for the service vehicles. Thus, weather is another condition impacting the schedule of the dispatch plan after the commencement of the day's deliveries.

Traffic Conditions

Traffic conditions are typically difficult to predict and are usually reported in a reactive manner. This includes occurrences of accidents, congestion, road constructions, etc., all of which impact traffic. While experienced delivery vehicle drivers may develop heuristic profiles of normal traffic volumes and conditions, abnormal conditions can always occur. One common occurrence involves road closings (e.g., construction, emergency road repairs, fallen trees due to weather, flooded roads, etc). In many cases, the driver may receive ad hoc communications (e.g., radio bulletins, personal phone calls, etc.) and may use personal knowledge to modify the route of the dispatch plan. In cases where delivery commitments exist, a review of the expected delivery times is appropriate.

Other Conditions

A variety of other conditions and events can impact the schedule of a delivery vehicle with respect to executing a dispatch plan. Each condition does not necessarily adversely impact the ability to meet service delivery commitments. Whether an adverse impact occurs requires an estimation of the severity of the condition in relation to the dispatch plan.

Process Overview—Major Components

Figure 3:
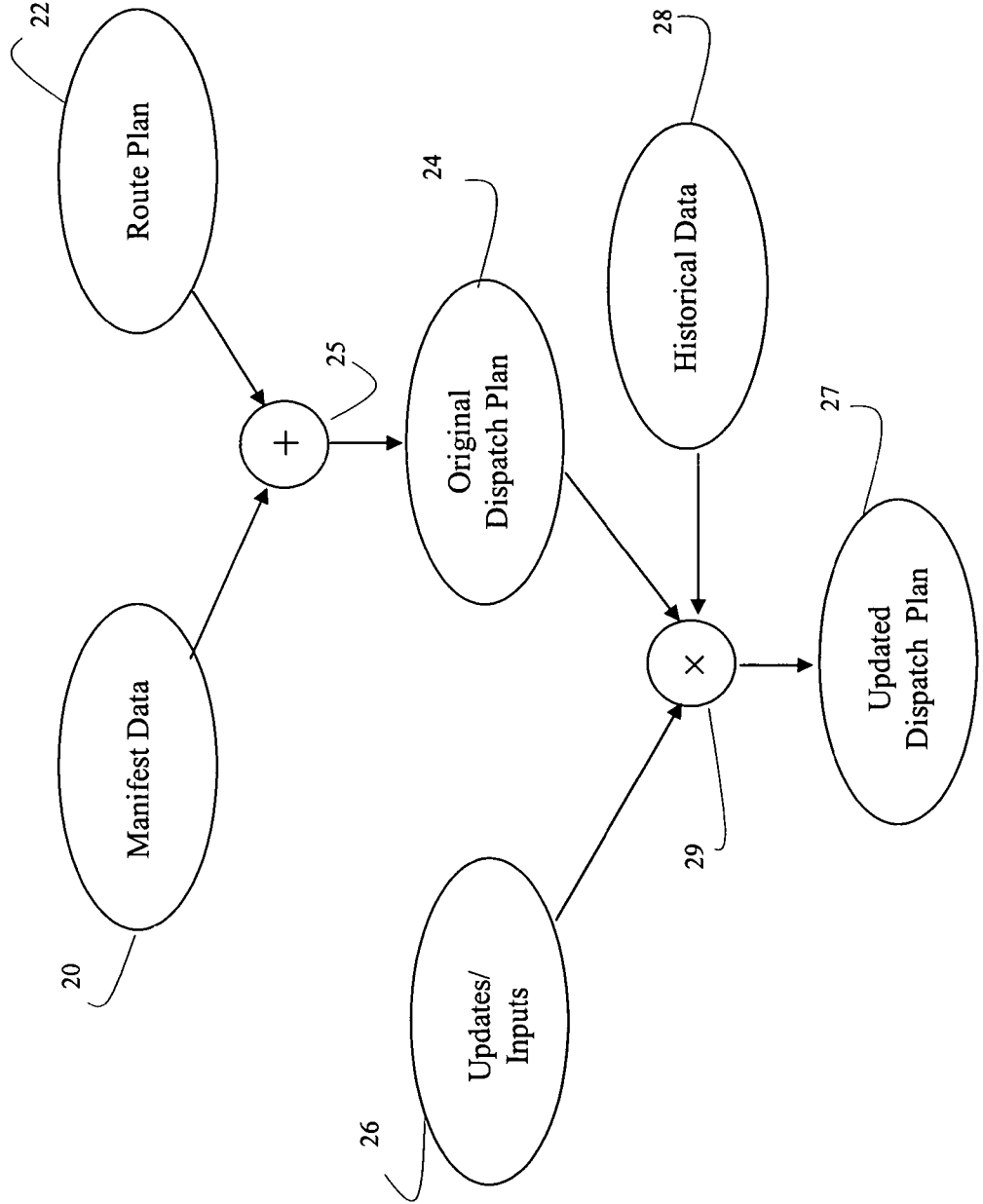
FIG. 3 illustrates one embodiment of various processes involved in producing an Updated Dispatch Plan.

FIG. 3 illustrates one embodiment of a high level process used to update a dispatch plan. As will be evident, variations of the process are possible that still embody the principles of the present invention.

In FIG. 3, the Manifest Data 20 represents the delivery data for a given work day associated with a delivery vehicle. The Manifest Data includes information pertaining to both package deliveries and pickups. The Manifest Data may be implemented as two separate files, one for delivery data and another for pick-up related data, or it can be implemented as one file. In other embodiments, the Manifest Data can contain other data, including service calls or other data pertaining to the service stops. At this stage, the sequence of records in the Manifest Data does not have significance. Once ordered, the Manifest Data can be considered a Dispatch Plan.

Figure 9:
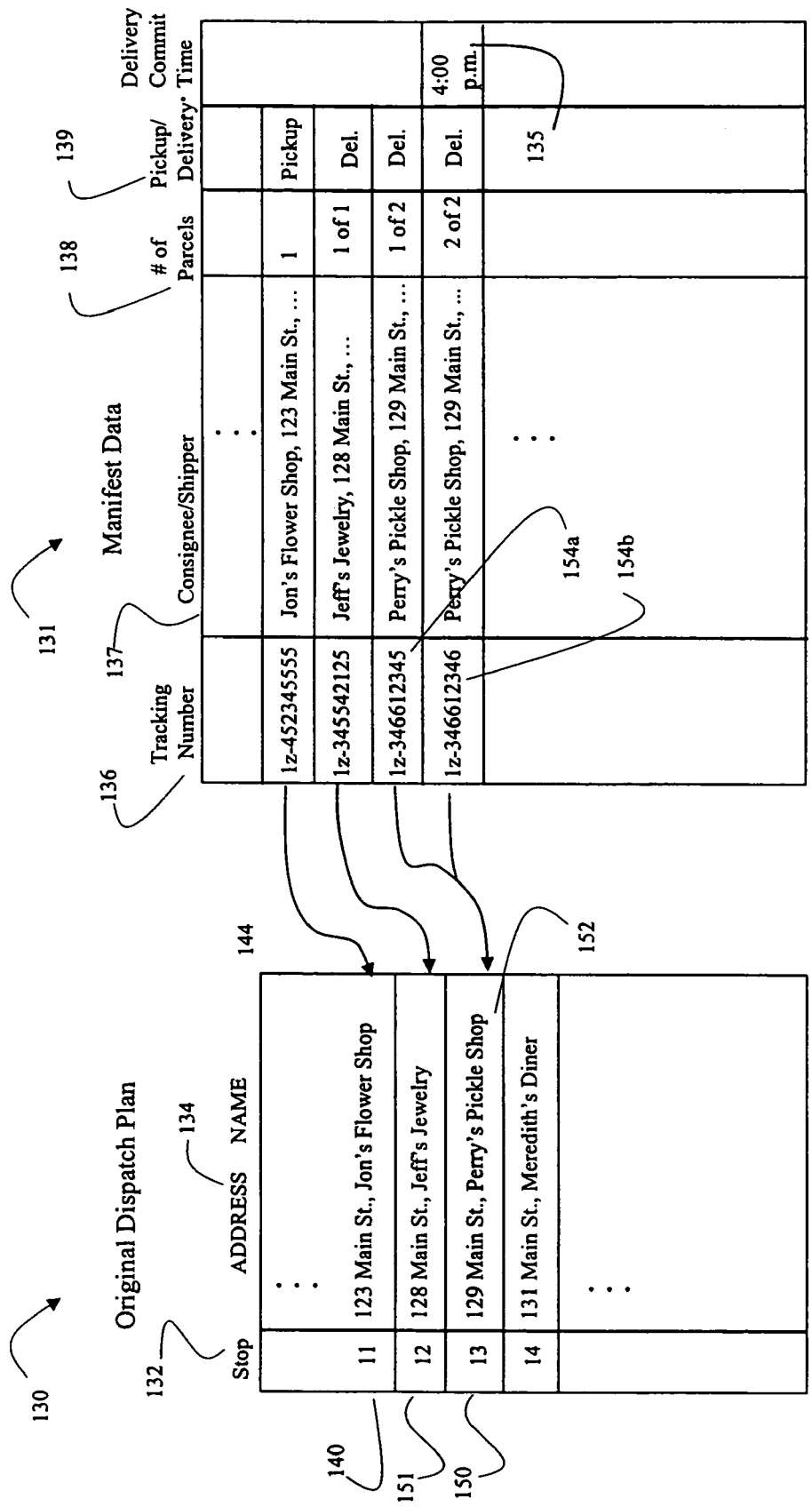
FIG. 9 illustrates one embodiment of an Original Dispatch Plan file and a Manifest Data file.

An illustrative format of a database file representing the Manifest Data is shown in FIG. 9. In FIG. 9, the Manifest Data table 131 comprises several rows, or records, of information. Each record can be considered as an independent collection of information pertaining to a service stop. Since the records are in a particular order to facilitate execution of the services stops, the table can be considered a Dispatch Plan.

The collection of information in each record comprises several columns or fields of information. Typically, there are more fields of information contained in the manifest, and only a few fields are illustrated in FIG. 9. For example, the name, street, city, etc. may all have separate fields. Other formats, order, and structure of each field are possible. The first column is a package identifier, illustrated as being indicated by a package tracking number 136. In table 131, each package to be delivered is identified by a tracking number, or some sort of other package identifier and this is used as an index to the table. In other embodiments, the table may represent service stops associated with other types of services, and the initial column may represent a work order number. Alternatively, the addresses could be used as the index. However, the table 131 is sufficient to illustrate the principles of the present invention based on a package delivery service as a representative embodiment.

Next, address information of the consignee or shipper is indicated 137. If the package pertains to a delivery, then the address of the consignee (destination) is provided. If the package is to be picked up, the address indicates the shipper (originator of the package). The next column indicates the number of parcels 138 associated with the stop and allows linkage between multiple parcels associated with a single service stop. For example, a delivery may involve several packages, and linkage is typically provided among all the packages associated with a given stop. This ensures delivery personnel have delivered all the necessary packages for delivery. In the illustration provided in the table 131, there are two packages 154a, 154b associated with the service stop at Perry's Pickle Shop. The next column indicates whether the stop is for a pickup or delivery 139 (in this example, the two packages are to be delivered). In other instances, a service stop may involve both a delivery and pickup. Finally, another column provides a delivery commitment time associated with the package, if one is indicated. In the example in FIG. 9, one of the packages to be delivered to Perry's Pickle Shop has a 4:00 p.m. delivery commit time 135.

Many formats and variations of the file structures are possible, and FIG. 9 represents only one embodiment for purposes of illustrating the invention. For example, logically separate delivery and pickup manifest files could be implemented. Further, a separate logical sequence indicator file could be used in conjunction with the Manifest Data to indicate a sequence of the service stops, which would be defined by the address information in the manifest. Further, additional information is typically associated with each package, such as the service level, originator information, internal sorting facilities handling the package, weight, etc. Representation of all the possible information contained in the Dispatch Plan or Manifest is not necessary to indicate the principles of the present invention. Further, it is possible that a subset of the information of the Manifest is used to create the Dispatch Plan since some of the PLD information is not required in order to effectively identify the next service stop.

Returning to FIG. 3, another component illustrated is the Route Plan 22. The Route Plan 22 in FIG. 3 comprises information regarding the route traversed by the delivery vehicle. Typically the route is defined within a previously determined geographic area, and comprises a set of roads that are traveled in a specific sequence. The universe of roads is usually geographically limited (e.g., the delivery area is defined within a limited section of a town, county, or state). This is typically the situation when a defined serving area is used to dispatch service vehicles. In other embodiments, the geographic area may be very large (e.g., a state or section of a country) and can be considered logically unlimited or unbounded. For example, a household goods moving service may service the continental U.S. While this serving area can be viewed as being unbounded, in reality, it is limited. In some contexts, an unbounded serving area can be viewed as one not having a regular traversed route.

In the embodiment provided herein, the route plan is somewhat static, i.e., the route reflects a regularly traversed path in which deliveries commonly occur (but not necessarily to every stop on every road). In addition to a static route, in some business contexts it is desirable that deliveries occur generally at the same time of day. For example, package pickup and delivery may be planned to occur roughly the same time every day at a given location. In other contexts, service stops could occur any time of the day. For example, in the case of dispatching service vehicles associated with a repair service as opposed to a package delivery service, the priority of the service call is used to determine the order of stops in the dispatch plan. Typically, the dispatch of a repair vehicle is not based on a historical arrival time of the repair vehicle associated with a previous service call to that location. In other contexts, it may be desirable that deliveries to a business location occur at a common time frame so that employees may coordinate other activities (e.g., employees at the business location receiving a delivery know when to take break time (or avoid certain times for breaks) or otherwise avoid time to start tasks that cannot be easily interrupted.

The Route Plan 22 may be based on a single vehicle performing deliveries in a given area, or it may take into account a set of vehicles. In some embodiments, a dynamic Route Plan can be used when there is no preference for customers to receive deliveries in any particular order or at a common time. The Route Plan may be determined in part by the manifest data without regard to other data, such as historical averages, preferred delivery times, etc.

The Route Plan 22 can be represented in different ways, and depends in part how the data is to be manipulated and presented. In some instances, a GIS (geographical information system) based systems may be utilized. Other implementations may provide a tabular listing of the delivery stops. The route plan may not be necessarily incorporated into the portable computer nor presented to the driver, since it is not an actual delivery plan (e.g., dispatch plan), but a reference model used to develop the original dispatch plan.

Figure 8:
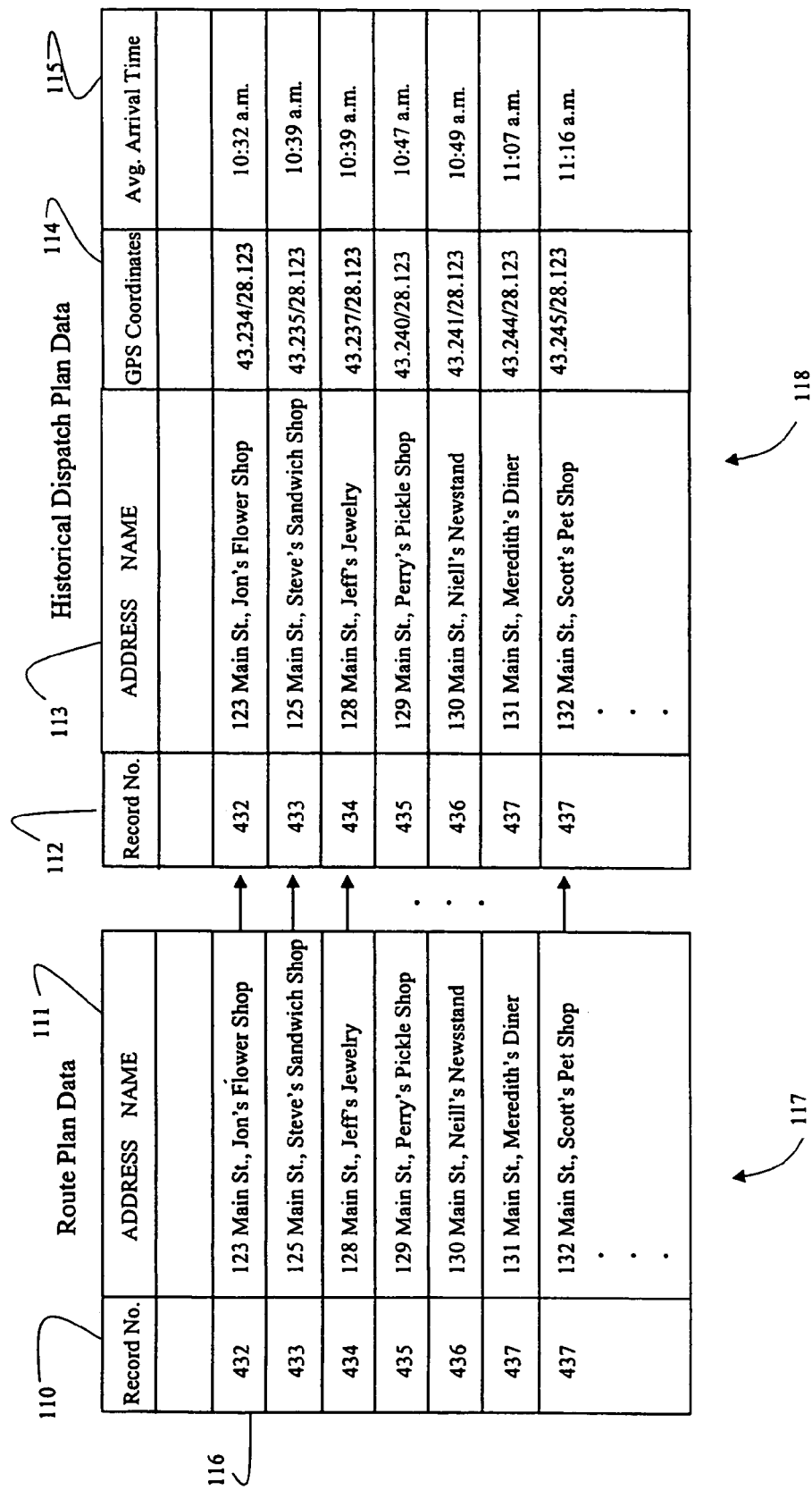
FIG. 8 illustrates one embodiment of a Route Plan Data and a Historical Dispatch Plan Data file.

To illustrate conceptually the Route Plan, FIG. 8 illustrates one embodiment, based on a tabular listing of potential service stops. In FIG. 8, the Route Plan Data 117 comprises a sequence of addresses. As shown in FIG. 8, a subset of the records is shown corresponding to businesses located on Main Street. Each record represents a potential stop for either delivering a package, or picking up a package. The addresses 111 are associated with an index, called a record number 116, which facilitates processing of selected addresses. Preferably, the addresses in the Route Plan are listed in order corresponding to the typically desired plan of delivery. For example, according to the table 117, Neill's Newsstands (record 436) is listed prior to Meredith's Diner (record 437) so that if deliveries were to be made to both locations, the delivery to Neill's Newsstand would be made first.

This embodiment results in a large number of records stored, each representing a potential service stop, not an actual service stop for a given day. Other embodiments may represent the route by a series of address ranges. This saves storage space and allows presentation of data in an easier to view form. Since this data may be stored and processed separately from the portable computer, memory storage requirements, processing speed, etc. are not a factor with respect to the portable computer. Thus, the addresses in the route plan could be represented as a range (e.g., "100-300 Main St.") without listing individual locations and names of occupants. This approach can also avoid having to update the data every time a new occupant is associated with the address (e.g., either an occupant moving into/out of a location, or a business relocating, opening, or closing).

In summary, the Route Plan in FIG. 3 indicates the general route taken by the delivery vehicle while the Manifest Data indicates data associated with the services stops required. Because the Manifest Data is not necessarily organized or logically ordered to reflect the desired order of delivery the service stops, additional processing 25 in the form of ordering the data is required to develop an initial or Original Dispatch Plan 24. The Original Dispatch Plan 24 of FIG. 3 is an ordered listing of service stops that are to be carried out by the delivery vehicle driver. Conceptually, the process 25 of creating the Dispatch Plan can be simply to process 25 the Manifest data to reflect the sequential order of delivery locations based on the Route Data.

Various methodologies are possible to create the Original Dispatch Plan 24, which has been used by various delivery companies for many years and are outside the scope of the present invention. Dispatch plans are well known in the art and can be produced by any number of well-known dispatching software applications, among them: Roadnet 5000™, Territory Planner™ and Mobilecast™. The Original Dispatch Plan 24 is downloaded into the portable computer, and may be structured in various ways, including graphical, tabular (e.g., text oriented), or both. While there may be efficiencies to structuring the data of the Original Dispatch Plan similar to the Manifest Data and/or Route Plan Data, this is not required to benefit from the principles of the present invention.

FIG. 3 also indicates various Updates/Inputs 26 that may be processed 29 by the portable computing device to trigger an update or modification of the Original Dispatch Plan, thus creating the Updated Dispatch Plan 27. The Update/Inputs 26 include the previously discussed inputs comprising weather information, traffic information, and changes to the manifest. The processing 29 of the inputs by the portable computer involves first determining whether the Update/Inputs may impact the remaining deliveries of the Original Dispatch Plan. Not all inputs may impact subsequent deliveries, and in order to determine whether there is an impact, a variety of approaches and data may be used.

For example, the process 29 may access a file containing Historical Data 28. Historical Data is reference data that can be used as an aid in determining whether and how to update the Original Dispatch Plan. It may be a subset of historical data used in a separate process (not shown) used to determine the Route Plan 22. The Historical Data 28 stored in the portable computer is only required to be limited to the serving area of the single service vehicle. The contents of the Historical Data can vary based on the business application, storage requirements, and type of input is to be analyzed. For example, the Historical Data could indicate completed service stops (e.g., completed deliveries or pickups) of the day's manifest. Because deliveries that have been already completed by the driver are not be impacted by subsequent developments, such as weather or traffic, it is only the remaining deliveries in the Dispatch Plan that must be analyzed in order to produce an Updated Dispatch Plan. The fact that FIG. 3 illustrates Historical Data as separate from the Manifest Data is for conceptual purposes only and is not intended to limit how the Historical Data is stored. In some embodiments, the indication of which deliveries/pickups have been completed are stored in conjunction with the Manifest Data or Dispatch Plan. Thus, conceptually, this portion of the Historical Data could be viewed as an augmentation of the Dispatch Plan. Typically a service stop completion flag in the Dispatch Plan is recorded indicating the service stop has been completed. Regardless of how the indication is recorded, data indicating past deliveries can be modeled as Historical Data.

The Historical Data 28 may comprise other types of historical data. The Historical Data can comprise a historical running average of time and location information associated with each potential delivery stop. This type of information serves as a term of reference against which the current status can be compared.

This aspect of the Historical Data captures, in part, the "experience" aspect of a driver by way of storing past delivery information that is used to provide a benchmark to determine whether the execution of a Dispatch plan is on schedule or behind schedule. If behind schedule, there may be a need to modify (e.g., re-optimize) the remaining deliveries in the Original Dispatch Plan. For example, experienced drivers on a route benchmark their performance throughout the day by comparing their location at a known landmark with the current time, and mentally comparing these to past experience of when the landmark was encountered. Or they may compare the current time with a degree of completion of the required tasks. By comparing a delivery vehicle's current time and location relative to past average time and location measurements on that give route, a level of "experience" can be built into the system, so that a determination of the schedule status ("ahead", "behind", or "on-schedule") can be determined, as well as the time required for completion of the remaining service stops.

The processing 29 to create the Updated Dispatch Plan 27 is typically not the same processing 25 used to create Original Dispatch Plan 24 (hence the processing icons 25 and 29 are represented differently). The processing of the Original Dispatch Plan may occur on a mainframe, and involve processing package delivery information for a group of vehicles in a composite serving area. The processing of the Updated Delivery plan, by its nature, processes specific inputs with respect to a subset of a single existing Original Dispatch Plan (e.g., those stops not yet performed) to determine whether a change to the Initial Dispatch Plan is appropriate and how that change is to occur. As previously discussed, it is not always the case that an Update or Input to a Dispatch Plan even impacts performance of the remaining service stops, or sequence thereof. If a modification of the order of the services stops is required, a separate process can modify the Original Dispatch Plan to create the Updated Dispatch Plan. The process of modifying the Original Dispatch plan is different from the process of establishing the Original Dispatch Plan, in that an new dispatch plan is created in the context of a single delivery vehicle, taking into account localized conditions, and attempting to meet the delivery commitments associated with a specific previously determine dispatch plan. Further, the modification of the Original Dispatch Plan typically takes into account at least some of the Historical Data (e.g., packages already delivered) whereas the Original Dispatch Plan starts with a list of packages yet to be delivered. Thus, if conditions warrant an update of the Original Dispatch Plan, the calculation of the Updated Dispatch plan is typically calculated using a different process than that used in calculating the Original Dispatch Plan.

The data structure of the Original Dispatch Plan and the Updated Dispatch Plan are typically similar. This facilitates processing and presentation of the data (either the Original or Updated Dispatch Plan) to the user. As discussed below, the format of the presentation of the Dispatch Plan to the user can be in various forms.

Updating the Original Dispatch Plan may occur in various ways. Updating may involve altering information in a record, adding a record, re-sequencing the logical order of the records, etc. In some cases, updating the Original Dispatch Plan does not require re-optimization (e.g., analyzing the sequence to re-order the stops). Recall there are various types of updates to the Manifest that do not adversely impact the performance of the Dispatch Plan. In other instances, updates may impact the performance of the Dispatch Plan, but may not justify analyzing the sequence. For example, simply adding a new service stop on a street just prior to an existing stop on the same street would likely not justify analyzing the sequence of records to determine if they should be re-sequenced. However, adding a new stop on a different road may justify analyzing the sequence of records to determine if optimization is appropriate. Further, different criteria, e.g., business rules, can apply to determine whether, and how, to update the Original Dispatch Plan. For example, assume the dispatch plan is modified by adding an unscheduled stop and there are no subsequent delivery commitment times. Thus, the remaining service stops are not constrained to be performed at any time or in any particular order. The business rules may not direct analyzing the Dispatch Plan to re-order the remaining stops to reflect the most optimized route. However, if one of the yet-to-be performed service stops has a time commitment, then analyzing and reordering the remaining stops may be in order.

Further, some business applications may define the criteria used to determine updated Dispatch Plan. Some applications may require the most optimized route (e.g. distance traveled)

whereas other business applications may opt to use a route that deviates as little as possible from the original dispatch plan, even if the distance traveled is not the most optimized. For example, a delivery service making regular service stops may desire to deviate as little as possible from the typical expected arrival times associated with the Original Dispatch Plan. This allows the delivery vehicle to complete deliveries at similar times and maintain customer expectations regarding delivery time windows. This may be critical when serving small businesses, such retailers, or commercial customers. Thus, in an urban environment, a small package delivery service may opt to maintain certain schedules, in order to avoid certain traffic patterns or maintain delivery times, even if the mileage driven is slightly greater. On an urban route of 50 miles, a slight deviation resulting in a 10% increase in mileage drive results in an additional distance of 5 miles. This may be acceptable in certain applications. On the other hand, a trucking company providing nationwide delivery services may opt to maintain the most efficient dispatch plan, even if it means that a greater deviation in originally planned delivery times. For a dispatch plan involving 2000 traveled miles, a 10% increase in the mileage driven (e.g., 200 miles) may be unacceptable. Furthermore, deliveries by the trucking company to a given recipient may be infrequent and the consignee may readily accept delivery any time of day.

In summary, the business rules impact how and when the Updated Dispatch Plan is examined when determining whether re-ordering of the records is required or desired. The principles of the present invention encompass various algorithms that determine how/when the Original Dispatch Plan should be changed in order to produce the Updated Dispatch Plan.

Figure 4:
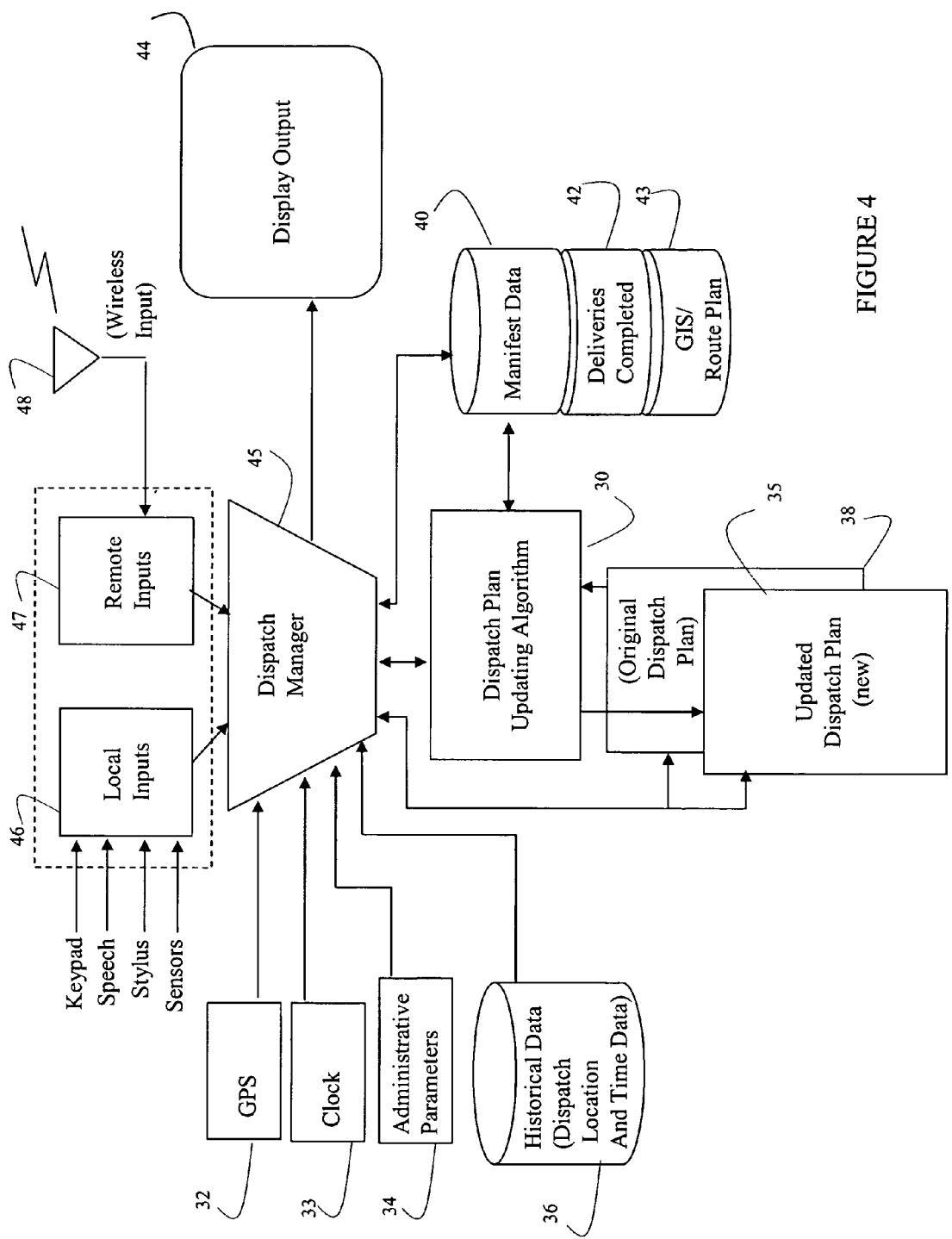
FIG. 4 illustrates one embodiment of various functions, processes, modules, and inputs associated with initiating an Updated Dispatch Plan.

The system embodied by the processing represented by icon 29 in FIG. 3 is illustrated in FIG. 4. Turning to FIG. 4, the Dispatch Manager (DM) 45 is a process or software module that receives various inputs and determines whether an update to the Dispatch Plan is appropriate. The DM can also manage the information presented to the user, as well as receiving inputs from the user and the other processes.

One form of input received by the DM comprises local inputs 46. Local inputs are typically user inputs entered from a keypad of a portable computer (e.g., PDA, laptop, or other device) incorporating the system of FIG. 4. Keypad input could include the user indicating various functions using "softkeys." Softkeys are keys whose function can change according to the operational context and are typically implemented by associating display information with a generic keypad, so the function of the keypad is indicated by the display. In this manner, the functions associated with the keypad can change as defined by a program.

Other forms of input include speech inputs, based on using well-established speech recognition algorithms. Speech recognition may be used for frequently used commands by the user as a more convenient input means. Selecting inputs, typically using a form of "pointing device" (including a touchpad, mouse, joystick, etc.) are another means for entering data. Finally, the system may also receive various inputs from sensors. The sensors may detect conditions associated with the delivery vehicle that are likely to result in a delay in the delivery of the packages. For example, an engine failure condition in the service vehicle could be reported and the DM would alert the driver, or other systems, of potential delivery delays. These inputs may be received wirelessly or via wired connections.

The DM may also receive inputs classified as remote inputs 47. Remote inputs are typically received via an antenna 48 associated with a wireless communications interface. Remote data input allows data to be received, typically from the dispatch service, modifying the dispatch plan, such as indications of additional service stops, changes in required delivery time for a specific package, updated traffic and weather conditions, etc.

The DM also receives inputs from a GPS device 32 providing the DM with the current position of the portable computing device (which can be used to approximate the location of the service vehicle). These inputs are typically in the form of longitude and latitude measurements and are continuously updated and periodically made available to the DM. The DM also receives input from a clock 33 providing current time information. In some embodiments, the GPS device can provide the current time information.

The DM can use the current location and time to compare the location of the vehicle along a route with an expected location and time. This involves using historical data (e.g., including past delivery related times and location data) to allow the DM to determine the likelihood whether the current days' execution of the dispatch plan is on schedule, behind schedule, or ahead of schedule. In order to perform this comparison, the DM accesses a database containing historical data, including historical dispatch location and time data 36. The historical location and time data can be stored in various forms and may include a moving average of typical times associated with a given location.

The DM also can access data in the form of administration parameters 34 used to select various user preferences, options, and default values, as will be discussed further. As it will become evident, various options for processing are possible, and the administration parameters allow selection of default values customized for the user or the particular application. For example, in an urban environment, graphical depiction of the dispatch plan using a roadmap may be unnecessary or not desired. On the other hand, in a rural environment, graphical depiction of the dispatch plan in the form of a roadmap using indicia representing service stops may be desired.

The DM also accesses data Manifest Data 40 (which could be embodied as the Original Dispatch Plan), Deliveries Completed database 42 (which also could be embodied in the Original Dispatch Plan), and potentially a GIS (geographical information system) database 43. As previously discussed, the Manifest Data includes information regarding package deliveries and pickups for the day and can be ordered to produce the Dispatch Plan. The Deliveries Completed data indicates data for deliveries (or other types of work actions) that have been completed and could also be embodied as within the Historical Data 36, the Dispatch Plan 38, or Manifest Data 40. For example, setting a completion indicator or flag associated with each record in the Dispatch Plan indicating the service stop has been completed is a typical embodiment. Thus, although FIG. 4 illustrates the logical types of data, the embodiment of the data can occur in various forms. For example, the Deliveries Completed data could be a separate logical database, or it can implemented by incorporating it with the Manifest Data or Historical Data. These implementation options reflect the various embodiments that are possible.

Further, although referenced as "Deliveries Completed", this data can include other types of non-delivery related data, including completed package pickups. At the beginning of the day, the Deliveries Completed database 42 is essentially empty (since no deliveries have been completed) and by the end of the delivery day, the Deliveries Completed database 43 is essentially the same size as the Manifest Data database 40 (since all the items in the manifest have been delivered).

Based on these various inputs and parameters defined by the Administrative Parameters, the Dispatch Manager 45 instructs the Dispatch Plan Updating Algorithm 30 to update the Original Dispatch Plan. The algorithm for determining the Updated Dispatch Plan can be based on a variety of existing algorithms and may be governed by various business rules, which would be maintained in the Administrative Parameters 34. In order to produce the Updated Dispatch Plan 35, the Dispatch Plan Updating Algorithm 30 must be able to access the Manifest Database 40 indicating what items are to be delivered as well as accessing the Deliveries Completed data 42 and the Original Dispatch Plan 38. The Updated Dispatch Plan only focuses on the plan for the deliveries or service stops that have not yet occurred. There is no need to develop a plan for those deliveries already completed. The Dispatch Plan Updating Algorithm may also access the GIS/Route Plan data 43 as input in determining the optimal Dispatch Plan by taking into account the roads and geographical location information. The Dispatch Plan Updating Algorithm may also have parameters indicating what business rules to use that define the criteria to use in forming the Updated Dispatch Plan. For example, the Administrative Parameters may indicate that minimizing miles traveled is the main priority when updating the Original Dispatch Plan. Alternatively, the administrative rules may indicate that priorities of service calls overrule distance traveled.

Once the Dispatch Plan Updating Algorithm 30 has produced the Updated Dispatch Plan, it typically stores the Updated Dispatch Plan in memory along with the previous dispatch plan, the Old Dispatch Plan 38. Both the current and previous Dispatch Plans are accessible by the DM algorithm 45 and can be displayed to the user on the Display Output 44, which is typically embodied using a bit-mapped LCD on the portable computing device. Each Dispatch Plan is typically viewed individually, and the user may be able to toggle back and forth as to which one is displayed. Alternatively, both the old and new Dispatch Plans can be presented simultaneously to the user. Maintaining the old (previous) and new (current) Dispatch Plan allows the user to compare, reject, or accept the processing of the system. In some instances, the system will not retain the "old" Dispatch Plan. For example, if a record is modified to the Dispatch Plan, the system may not present the user an option of 'rejecting' the Updated Dispatch Plan. Thus, the system may not even present the user with the option of viewing and comparing the two dispatch plans. In other instances, where the system reorders the sequence of the records to product the Updated Dispatch Plan, the user (e.g., driver) may have information not available to the system, may 'reject' the updated plan and instead prefer the previous sequence of service stops. Once the driver accepts the new Dispatch Plan, the system may erase the old Dispatch Plan in order to free up memory and label the Updated Dispatch Plan as the current one.

The display of information associated with the Dispatch Plan to the user may be in several forms. In one embodiment, the display of the Dispatch Plan may be in a tabular or text-based form, listing the stops in order of occurrence on a line-by-line basis. Typically, only a subset of the Dispatch Plan is presented, such as the next five stops, as displaying all the information in the record may not be required. Typically, at least the address of the service stop in the record is displayed.

Figure 11:
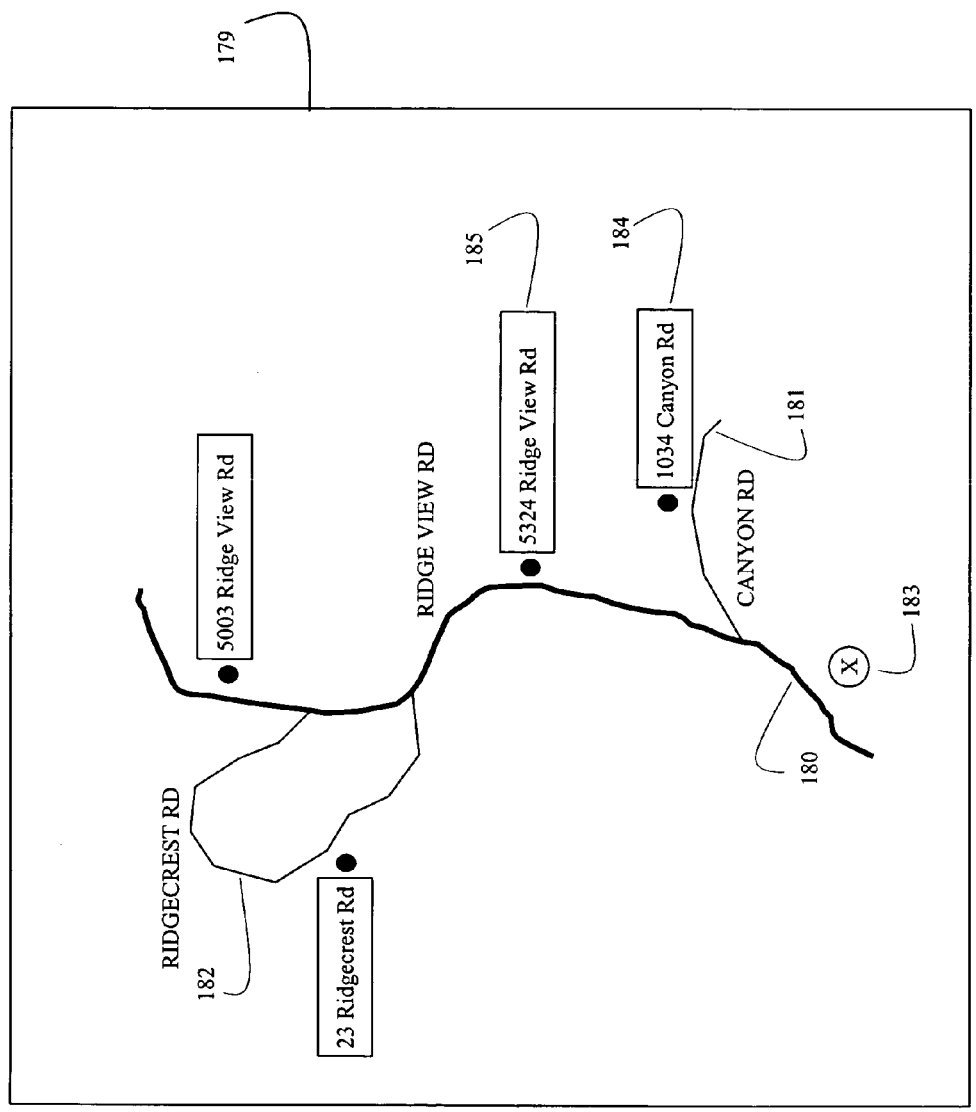
FIG. 11 illustrates one embodiments of a graphical presentation of a Dispatch Plan.

Alternatively, or in addition, the DM may display the Updated Dispatch Plan using the GIS database to formulate a graphical map (e.g., road or street map) of the route using icons indicating the required stops. The preference for selecting the default presentation format to the user may be contained in the Administrative parameters 34. For example, FIG. 11 illustrates one embodiment of the graphical dispatch plan. In FIG. 11, a display 179 on the portable computer shows a map or portion of the map associated with the Dispatch Plan. The display shows a main road, Ridge View Road 180. The current position of the vehicle is illustrated using an icon 183. Also shown are relevant side streets, such as Canyon Road 181 and Ridgecrest Road 182. The service stop locations are plotted in their relative positions on the map with abbreviated address information (typically the street address only and not including the city, state, or zip code), and it is readily apparent to the driver the route that should be used for the next stop. Specifically, based on the current position, the first stop would be 1034 Canyon Rd 184, followed by 5324 Ridge View Road 185, etc.

Returning to FIG. 4, although the DM 45 of FIG. 4 uses the inputs to determine whether to automatically invoke the Dispatch Plan Updating Algorithm 30. In some instances, the DUP will update the Dispatch Plan, erase the old Dispatch Plan, and notify the user of the change (such is the case if a new stop is added). In some embodiments, the DUP will then automatically, or manually request, processing of the Dispatch Plan to potentially re-sequence the records to obtain the most efficient route. In some embodiments, the user may be notified of the input received (e.g., the addition of a new service stop) and manually direct the system where the update (e.g., new service stop) is to be inserted. For example, the user may recognize external conditions that are not considered by system and desire to override any automatic updating. The receipt of an input potentially impacting the Dispatch Plan could be brought to the attention of the user by flashing an icon on the display and/or providing an audible or other visual signal indicating a need for the user to review the inputs. At that point, the user can manually trigger or review the updating of the Dispatch Plan by providing the appropriate input. In some embodiments, a change to the Dispatch Plan (thereby producing the Updated Dispatch Plan) may occur and can be signaled to the user, but in which there is no necessity of potential re-sequencing the records or authorization required from the user. For example, a change in the class of service of a package for pick up would not typically require re-ordering of the service route, nor would it require the user to manually trigger the processing of the Dispatch Plan to potentially re-sequence the records.

Figure 12:
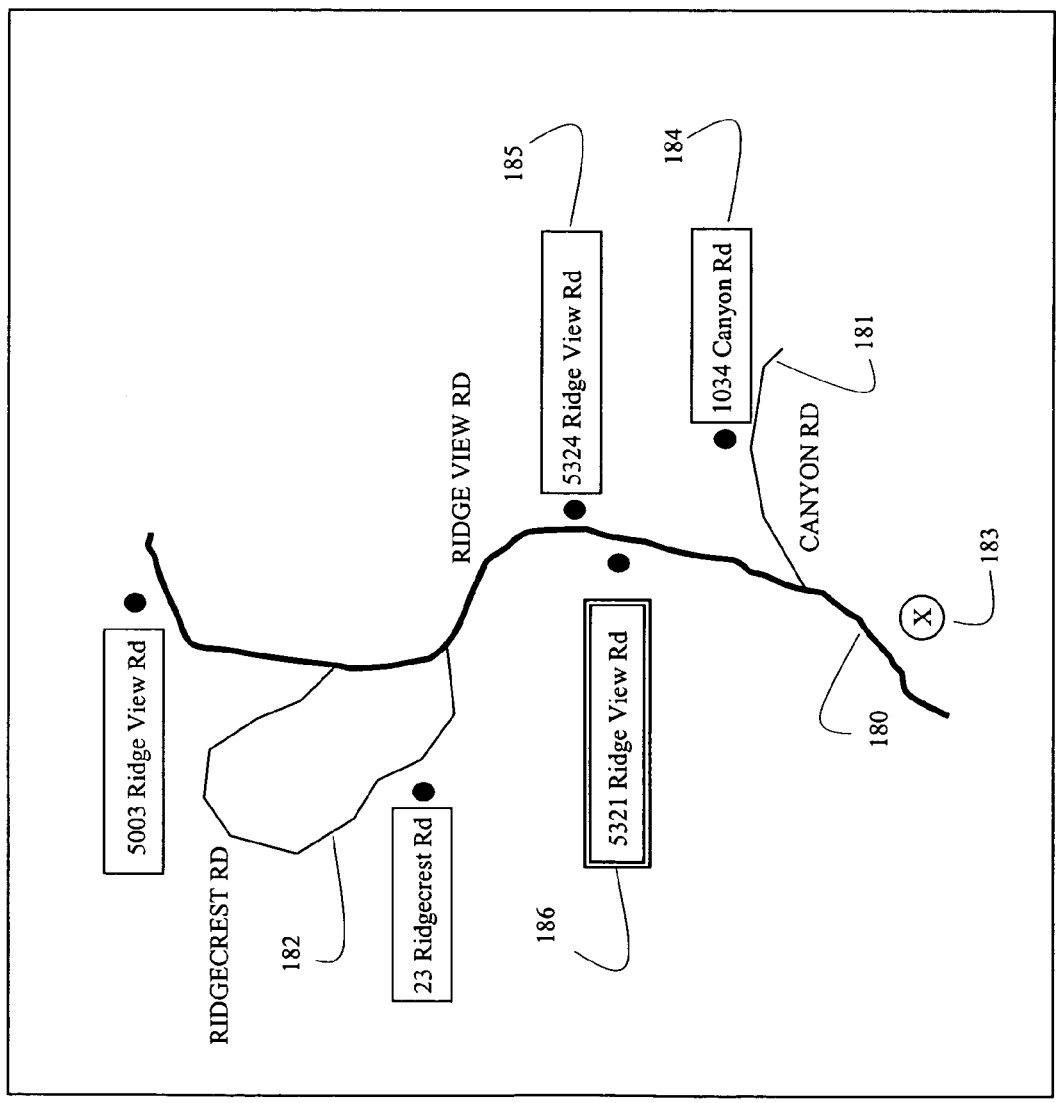
FIG. 12 illustrates one embodiment of a modification to a graphical presentation of a Dispatch Plan.

In another embodiment, the Dispatch Plan is presented to the user in graphical form. In this embodiment, the user can heuristically re-analyze and/or re-order the sequence of service stops mentally, without the portable computing device reordering or altering the structure of the Dispatch File (although this is not precluded). For example, turning to FIG. 12, assume the system has received an updated service stop for package pickup at 5321 Ridge View Rd. The system plots this location 186 on the map by overlaying indicia (e.g. a dot, circle or other icon) on the map representing the service stop, which can be done using software well known in the art. The system may highlights the new information to facilitate the user readily identifying the new information (this location 186 is represented in FIG. 12 as a double-lined box, although in other embodiments blinking text, different fonts, colors, etc., could be used to alert the user of an update to the Dispatch Plan). The system does not necessarily determine the route used by the driver, as the system may rely on the driver heuristically determining the route based on viewing the image. In this case, it is obvious that the driver should add a new stop located at 5321 Ridge View Road 186 just prior to the delivery at 5324 Ridge View Rd 185. One the other hand, if the route is traversed in two directions (e.g., Ridge View Road is a dead end, requiring the delivery vehicle to turn around after stopping at 5003 Ridge View Rd), then the new stop would be serviced on the return leg of the route.)

In tabular based listings, the updating of the Dispatch Plan Updating Algorithm may be accomplished by simply insert the record containing the new address in the existing sequence of records that makes up the Dispatch Plan, wherein the insertion of the record is based on a numerical order of the new service stop (as indicated by an address) relative to other service stops on the same road. Thus, updating the Dispatch Plan may involve adding the new record for the new service stop (e.g., 5321 Ridge View Road) by logically placing the record in the sequence of records just prior to the record associated with 5324 Ridge View Road. Re-analyzing the most optimal route for all the remaining stops is not required.

Figure 13:
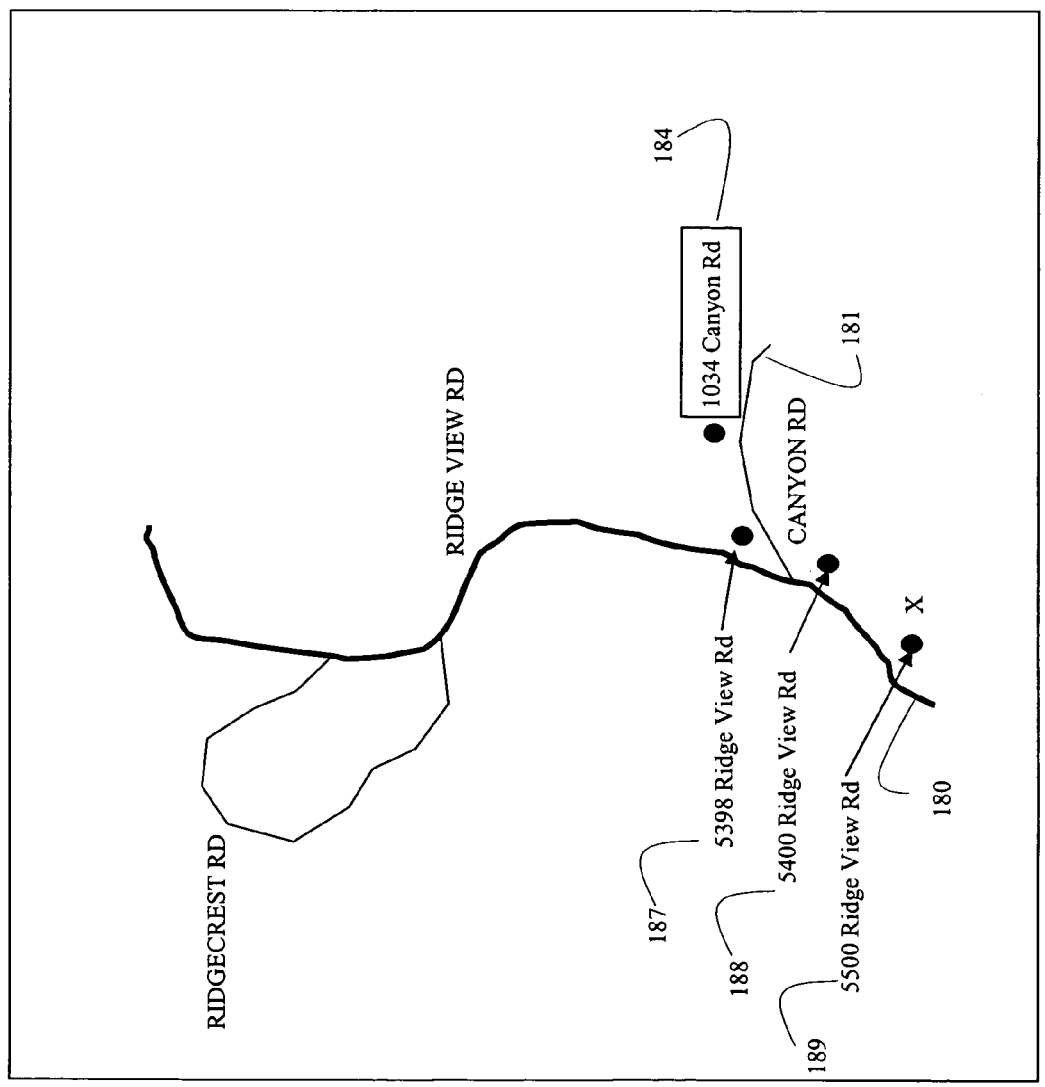
FIG. 13 illustrates another embodiment of a modification to a graphical presentation of a Dispatch Plan.

If the new service stop is associated on a road which does not have any other existing service stops, other algorithms may be used to determine where to insert the new stop into the Dispatch Plan. For example, data structures representing the route can be used to determine where to place a new stop on the list. Turning to FIG. 13, it is observed that in this embodiment the addresses on Ridge View Road 180 begin with 5500 Ridge View 188 and continues to 5400 Ridge View 188 without any side roads. Between 5400 Ridge View 189 and 5398 Ridge View 187 is the side road, Canyon Road 181. Thus, any address on Canyon Road, including 1034 Canyon Road 184 should be placed between 5400 Ridge View and 5398 Ridge View on the list. If the Dispatch Plan is implemented as a sequence of records, any record associated with Canyon Road should be logically added after 5400 Ridge View Road and before 5398 Ridge View Road. Those skilled in the art of data structure will recognize that various algorithms can be used to represent such data, allowing updating and efficient searching of the data.

An alternative scheme is to use the graphical map to determine the shortest distance between the new service stop and all the existing service stops and insert the new service stop in the list just prior to it. The distance could be based on the shortest geographical distance or shortest distance based on road travel. This may not necessarily reflect the most efficient order (since one way streets or other road conditions unknown by the portable computer may impact the actual distance or travel time), but this simplified algorithm may be preferred for some applications.

Figure 5:
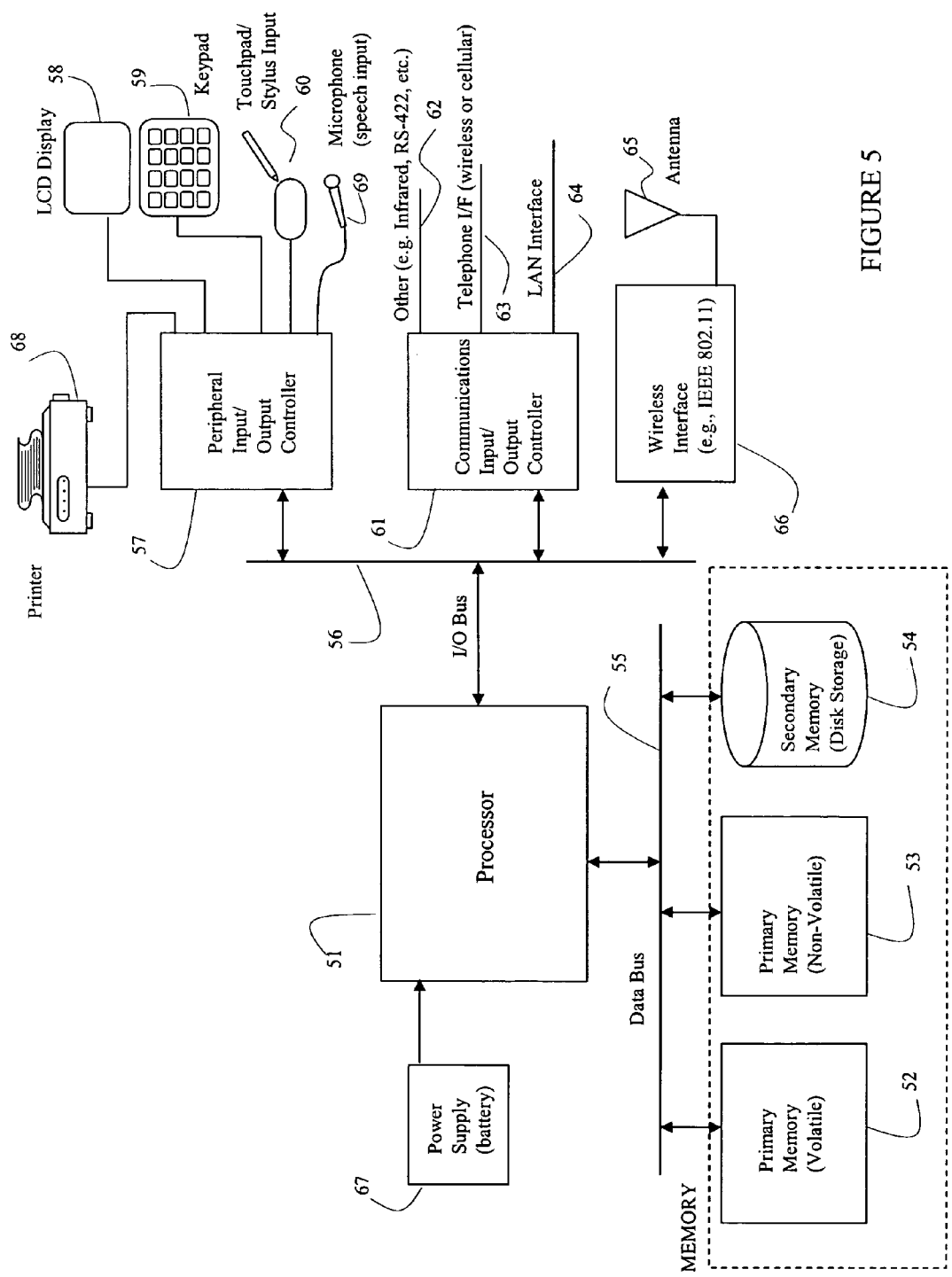
FIG. 5 illustrates one embodiment of various hardware components, modules, and functions associated with a system executing processes for producing an Updated Dispatch Plan.

One embodiment of the hardware architecture for the portable computer executing the aforementioned processes is illustrated in FIG. 5. Although this could also be executed on a DIAD-type device, a separate general purpose computer (e.g., PDA or laptop) could be used as well as a computer integrated into the service vehicle. FIG. 5 illustrates one embodiment of the hardware components and their high level functions and interactions. Typically, a processor 51, which is typically powered by a rechargeable battery power supply 67, executes instructions associated with various applications, including the process that dynamically updates the Dispatch Plan. The processor communicates with various types of memory via a data bus 55. The memory includes primary (volatile) memory 52, such as RAM, which typically stores application software, input data (such as the day's manifest, if stored separate from the Dispatch Plan), and the results of the Updated Dispatch Plan. The memory also includes non-volatile memory 53, which may store various parameters, BIOS (basic input/output system) routines, as well as system and application level default data. The secondary memory 54 is able to store the historical dispatch data 36, and other databases such as the GIS 43. Various embodiments may store data in various types of memory based in part on storage capacities and performance requirements.

The processor 51 also uses an I/O bus 56 to communicate with various components, such as a wireless interface 66 that can send/receive data from an antenna 65. This interface can be based on unlicensed low power spectrum (such as that used by one of the various IEEE 802.11 standards) or licensed spectrum (such as used by cellular systems, including GPRS, EDGE, or CDMA-based data communication protocols). The wireless interface is used to receive remote inputs once the delivery vehicle is en-route, as previously described. Although primarily used for data, the wireless interface could also convey voice.

The processor can also communicate using other interfaces 61, including those well known in the arts, including wireline LAN interfaces 64, telephone communications 63 (including accessing the Internet), or other types 62 (including infrared, high speed serial communications, etc.). These interfaces may be used when the portable computing device is docked and downloading/uploading data to a dispatch server at the beginning/end of the work day.

The processor may communicate with other local input/output devices, including a tactile input device 60, which can be embodied in various forms, such as a mouse, touchpad, signature pad, stylus, etc. The processor typically also receives user input from a keypad 59 and displays information, typically on a color bit-mapped LCD display 58. The processor may also receive speech input via a microphone 69, in order to perform speech recognition to recognize data input values or commands from the user. The processor may communicate with a printer 68, although this communication is typically not performed when the system is operating in the delivery vehicle, but may occur at a customer's premises. Although illustrated as a wireline connection, the communication to the printer can also occur with using a wireless interface (e.g., IrDa, Wi-Fi, etc.).

Figure 6:
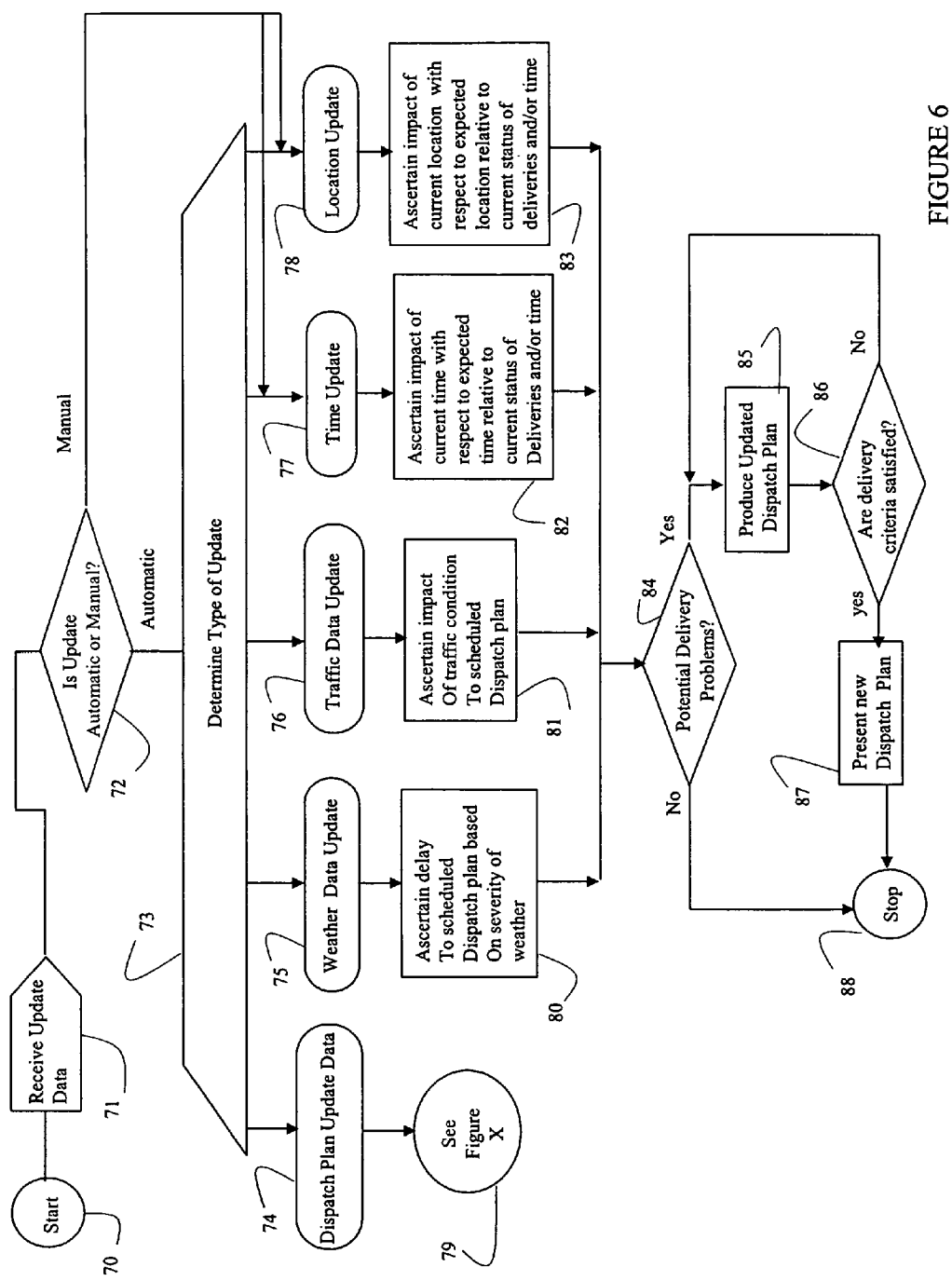
FIG. 6 illustrates one embodiment of various types of updates triggering an Updated Dispatch Plan.

Next, turning to FIG. 6, a high-level flowchart illustrating one embodiment of the processing of inputs to the Dispatch Update Process. At a high level, the system receives an input and, based on the input, may determine: whether the delivery status is "on schedule," whether there is a potential issue associated with meeting the delivery obligations, and whether there is a need to reexamine the remaining work items associated with the Dispatch Plan. If the delivery status is "on schedule" (meaning at least that no potential delivery obligations are in jeopardy), then the process may be configured (based on business rules) to maintain the current sequence of records in the Dispatch Plan. If, however, a future delivery obligation is in jeopardy, the system may re-sequence the Dispatch Plan correcting the potential problem and/or notify the user or a remote system of the potential condition. It is possible re-optimizing the sequence of records may require the portable computer to invoke an iterative process, in which the processor may calculate several Update Dispatch Plans, which are tested internally, before an acceptable Updated Dispatch Plan is produced/selected and presented to the user. In other embodiments, the Updated Dispatch Plan may be only a graphical depiction of the service stops, and there is no optimization of record sequences to be performed.

In FIG. 6, the process begins at the Start icon 70 after which Update Data is received at step 71. The Update Data may be received locally (e.g., keypad, GPS data) or remotely (using the wireless interface). The Update Data can be categorized as being one of two types: automatic or manual. The distinction is that an automatic update does not involve operator intervention, and the updating of the Dispatch Plan is determined by the Dispatch Update Process itself. On the other hand, the automatic update typically is triggered (but not always), based on new delivery related information received by the system, such as changes to the Manifest (e.g., a new pickup location to be serviced). Another common trigger of the automatic update is based on a current time input. In this case, a local periodic process in the portable computer determines an update is appropriate.

Another common trigger is a manual update that is entered by the user (typically the driver of the vehicle). With the manual update, the user may simply request a "check" of the status, or the user may manually add further Manifest related information. A typical embodiment is the operator requesting a status check based on the current delivery status. For example, the driver may suspect that deliveries are behind schedule and request the system to ascertain whether an updating of the Dispatch Plan is appropriate. The system then compares the current time and/or location against either the Manifest and/or historical data to obtain a benchmark as to the current delivery status. In other embodiments, the manual trigger (or update request) may be coupled with another action, such as indication completion of the service stop (e.g., that a package has been delivered at the service stop). Thus, whenever a user indicates completion of the task, the system automatically analyzes the services stops that have not yet been performed to determine whether a new optimization can be determined.

In other embodiments, the receipt of remote input data may trigger a notification to the user of its receipt, and the processor may request authorization from the user to invoke the update process or a potential reordering of the records in the Dispatch Plan. In other instances of manual input, the operator may provide updated information manually and then request updating of the Original Dispatch Plan. Such may be the case if the vehicle driver observes a condition (e.g., road closed or traffic jam) and manually indicates the conditions to the system and requests the system to update the Dispatch Plan.

Because there are many different conditions and types of manual input, FIG. 6 illustrates only a single, simplified embodiment in which the manual updates provided by the user do not provide additional information to the portable computer, but rather invoke the update based on time and/or location. This embodiment is sufficient to illustrate the principles of the invention and those skilled in the art of designing such systems will be able to identify other variations.

The explanation of the update processing first examines the manual update, as it typically is narrower in scope, and provides a basis for explaining the other types of input that may result in an update. In this embodiment, it is assumed that a manual update request has been indicated by the user, and that the request does not include any additional information. A typical application is when the vehicle driver, using the portable computer, suspects that deliveries are behind schedule or completes a service call, and requests the system to verify the schedule status (specifically, pertaining to the services stops not yet performed or completed). The user input may be indicated by the user selecting an icon on a touchscreen, a softkey, or dedicated function key to request the system to perform an update.

In this embodiment, the system processes the manual request for an update similar to an input automatically processed by the system based on either a time update 77 or a location update 78. These represent two methods that can be used to ascertain the status of the performance of the Dispatch Plan (e.g., whether it is on or behind schedule).

Figure 14:
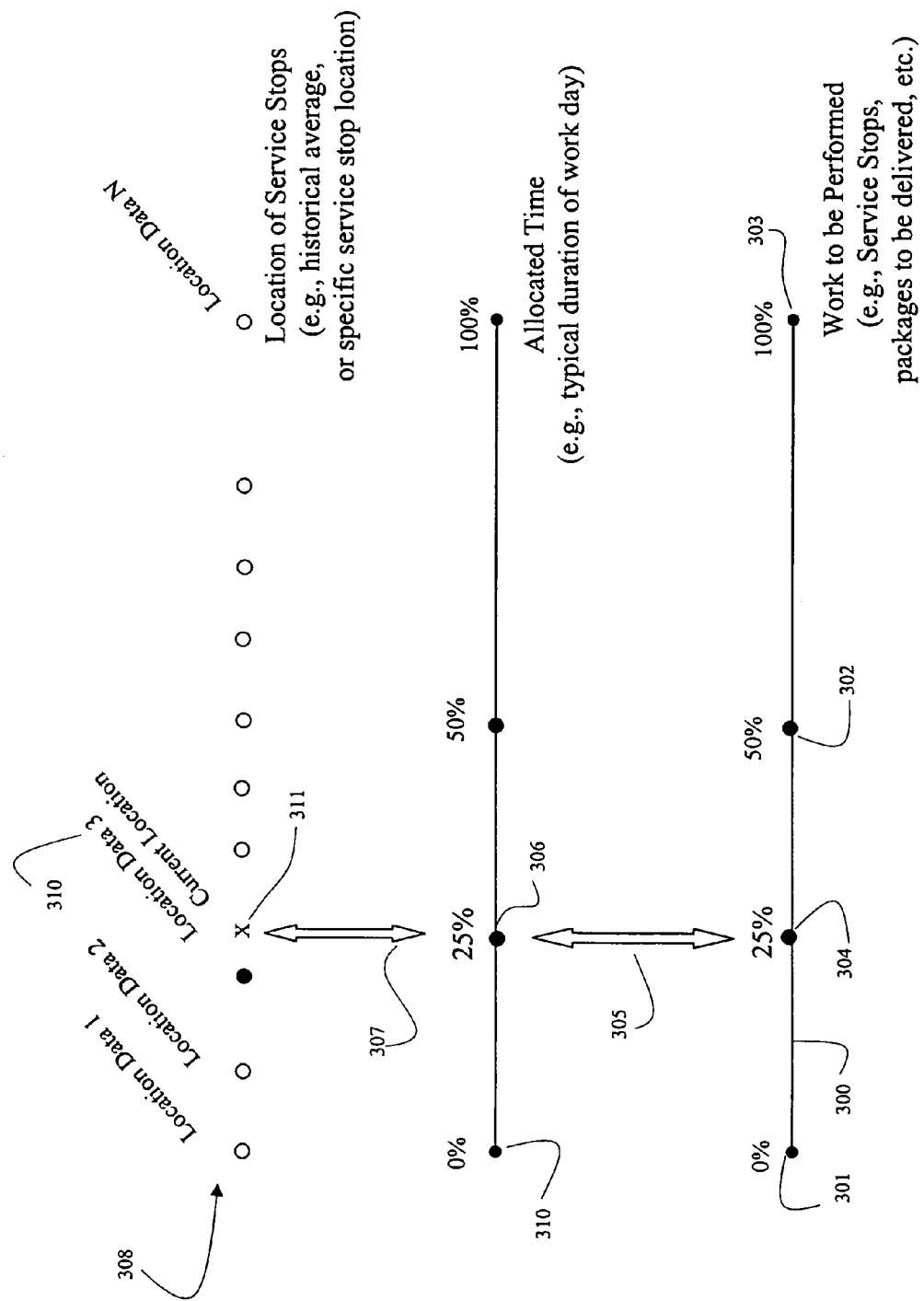
FIG. 14 illustrates a conceptual mapping of a schedule status with respect to time, location, and the work to be performed.

FIG. 14 provides a high level overview of how this can be accomplished. In FIG. 14, one line 301 represents work that is to be performed. This could be measured in service stops, packages delivered, completion of a service, etc. In the present embodiment, typically completion of a service stop or delivery of a package is the minimal work unit. Other embodiments may use other metrics. The line is represented as a continuum, in that the work to be performed can be viewed serially, with points representing 0% completion 301, 50% completion 302, and 100% completion 303. The work to be performed is defined by the Manifest or the Dispatch Plan (since the Dispatch Plan can be viewed as an ordered Manifest, both define the service stops that need to be completed). The level of completion ("completion status") of the Dispatch Plan can be easily determined by comparing the ratio of service stops completed (or packages delivered) with the total number of service stops (or packages). The previously mentioned completion flag or indicator provides an indication of whether the corresponding service stop in the record has been performed. Thus, completion of 30 service stops from a total of 120 represents 30/120=0.25 or 25% completion. This would correspond to point 304 on the line.

Another line 310 in FIG. 14 represents the time allocated for performing the work. Typically, this is a work day, with a defined number of hours (e.g., eight hours). Again, this metric (time) can be though of as a continuum, with points representing 0%, 50%, and 100% of the allocated time. By using a current time clock along with the defined daily work schedule, the progress along this metric can be easily measured. For example, 50% of the allocated time would typically correspond to four hours into the work day, which if it started at 8:00 a.m., would correspond to 12 noon. Similarly, 25% passing of an 8 hour day would correspond to passing of 2 hours, which would correspond to 10:00 a.m. This would correspond to point 306 on line 310.

Finally, another metric shown in FIG. 14 represents an ordered series of location data 308. Since the locations themselves are not necessarily linear (e.g., along a street), and it is the data representing the location which is manipulated by the portable computer, this metric is represented logically by points representing a location, identified by location data (e.g., GPS coordinates). This metric is represented by an ordered sequence of location data 308, which is found in the Dispatch Plan. Determination of the percentage of completion of the service stops in regard to location data can be done several ways. First, the number of stops can be determined by counting the number of location data records (which should be equal to the number of stops), and a particular location data can be identified by the relative order in the sequence. Thus, location data in the third record out of a total of ten could be considered as 30% completion. If there are only ten stops, then 25% completion would occur between the second and third stop. Another approach for using this metric for determining completion is to read the current location using the GPS device in the portable computer, and identify the service stop that is the closest in the ordered list. Once that is known, the completion status can then be determined. Thus, a location corresponding between the second and third stop (out of a total of ten) could be viewed as a 25% completion rate.

It is evident that these three of these metrics are interrelated and a mapping can occur from each of these metrics. The portable computer can track time, its location, and record the completion of a service stop in the Dispatch Plan. The portable computer can then compare the relative completion status of each metric. Since the progression of time is constant, this metric is typically used as the baseline. Thus, the status of the Dispatch Plan fundamentally compares the completion status of the work to be performed with the allocated time, or the present location with respect to the planned service stops with the allocated time.

As the work day progress (e.g., time passes), the work to be performed is completed, and as does completion of service stops associated with the sequence of location data. It becomes evident that determining whether the schedule is current or not can be defined in different ways as well as computed in different ways.

For example, type of update shown in FIG. 6 is the time update 77 used to determine the current execution status of the Dispatch Plan ("Dispatch Plan Schedule", "schedule status", or just "status"). The system determines the ratio of work performed to the total work and arrives at a work completion status. In FIG. 14, one point corresponds to 25% 304. This percentage can be mapped 305 to a time completion status, which in normal situations should be 25% 306 as well. Based on the knowledge of the work day duration and start time, the 25% of the work day corresponds to a known time, which can be assumed to be 10:00 a.m., which can be thought of as the "expected time." The portable computer knows the current time via the internal time clock; if the current time is 10:00 a.m., then the expected time and current time are the same and the Dispatch Plan is on schedule. However, if the current time is 12:30 p.m., then deliveries or the status can be viewed as behind schedule. Similarly, if the current time is earlier than the expected time, then the Dispatch Plan is ahead of schedule. The administrative parameters may define a threshold (e.g., a limit of the difference between the actual time and expected time) beyond which a delivery is considered as "ahead of schedule", "on-schedule", or "behind schedule." Thus, if the current time and expected time are one minute apart, the Dispatch Plan would likely be viewed as being "on-schedule", as opposed to being behind or ahead.

If the system determines that deliveries are "behind schedule", it can then trigger the Dispatch Updating Process to determine if the records in the Dispatch Plan can be sequenced more efficiently or simply notify the user appropriately. The portable computer can even notify the central dispatch system, which can potentially allocate additional resources or ask the driver whether particular problems are encountered.

Obviously, if a delay has caused the schedule to fall behind and the remaining service stops are already in the most efficient order, there is little reason to re-analyze the order of the remaining service stops again.

Alternately, computation of the schedule status of the Dispatch Plan can be performed based on the current location of the vehicle. If the manual update is based on location as indicated in step 78 of FIG. 6, then the system ascertains the current location relative to an expected location using the current completion status in step 83.

Again, a variety of algorithms can be used, and returning to FIG. 14, one embodiment may compare the current location of the delivery vehicle (using the aforementioned GPS inputs) to determine the closest service stop. Thus, in FIG. 14, the current location denoted by a "X" 311 may be determined to be closest to Location Data 3 310 in the Dispatch Plan. Since the stops are typically not linearly spaced out, the third record can be used and the relative completion status would be 30%. This is close to the allocated time, which is 25%. The system may deem the difference is negligible, and consider the Dispatch Plan "on-schedule."

Alternatively, in an application in which the route is rural and the distances between stops are great, the above estimation can be made more accurate by using historical location data. For example, considered a rural route involving 20 stops, each 10 miles apart, for a total route of 200 miles. The use of location data (alternatively, odometer readings could be used) allows the system to determine the overall route distance and the traveled distance. If the traveled distance is 50 miles on a 200 mile route, this represents 25% completion of the route. Thus, the performance of the Dispatch Plan would be on schedule.

The historical data can be collected by the portable computer by periodically recording its location at fixed time intervals, and determining an average location at a given time. Alternatively, the portable computer can maintain location data for each service stop, and use that to determine where in the Dispatch Plan it is, and what the relative completion status is. This type of computation does not require a running average or data of past delivery data, although that may be collected for other purposes.

Thus, a manual update may be based on comparing the current time, current location, or a combination of two, with historical average delivery data or the current Dispatch Plan. The preference can be indicated by the administrative parameters or hardcoded into the routine. The choice may be selected based on the characteristics of the delivery route. For example, a delivery route characterized as having few stops, but with great distances between stops (typical of a rural or suburban route) may find it more accurate to base the processing of the current schedule status based on location determination. In this application, the distance between service stops may be comparative lengthy and travel time may dominate the allocated work time. Thus, providing the driver with Dispatch Plan status information when there is only one service stop (e.g., long haul trucking with a single destination) would be of little benefit. In that case, until the delivery is made, the Dispatch Plan would be viewed as 0% completed and once the delivery is completed, then the Dispatch Plan is 100% completed. In this application, using location in conjunction with time provides a more useful status indication to a driver.

On the other hand, a driver executing a Dispatch Plan having many stops, but with short distances between each stop (typical of an urban route), may find a time-based Dispatch Plan status indication more useful and accurate. Urban routes involve less travel time and more time of the driver (and the portable computer) occupying the interior of buildings where GPS signals may not be available. This lends itself to using a time based status update routine. Further, the location at a single stop (e.g., a mall, office tower) represents a single location that may occupy significant time of the driver. Other embodiments may use a combination of the two.

Turning back to FIG. 6, once the status has been determined (regardless of the metrics used to determine the status), the system determines whether a potential delivery problem may occur 84. Determining whether a potential delivery problem is possible may be based on several criteria including whether a threshold relative to an expected schedule has been exceeded. It may involve determining whether any remaining delivery commitments are impacted or whether the remaining services calls in the current Dispatch Plan are less than optimized. What constitutes a problem is not limited to unattainable delivery commitments, but can be broadly defined. For example, wide loads are prohibited on interstate highways after dark. If the Dispatch Plan indicates that arrival at the destination occurs after a time in which darkness has fallen, this could be considered a problem requiring attention of the driver.

Determining whether a problem may occur only involves examination of those records in the Dispatch Plan whose work activities or service stops that have yet to be performed. For example, if there are no packages with delivery commitments, then the system may determine there are no potential problems, even if the current delivery is running behind schedule. If, on the other hand, there is a remaining service stop with a required delivery time requirement, then a delay beyond the threshold may result in a potential delivery problem. There is no need to examine those service stops that have been completed.

If there are no potential problems, then the process is done 88. If there is a potential problem, the system may produce an Update Dispatch Plan 85 using any one of several available algorithms to see if re-optimization is required and will alleviate the problem. The update may be graphical, tabular, or both, as previously discussed. The system at step 86 typically then checks whether the delivery commitments are satisfied by the Updated Dispatch Plan, and if not, the Dispatch Plan is re-calculated 85. This presumes that a solution is possible, though in some cases, a delivery commitment may not be able to be fulfilled by modifying the Dispatch Plan. In such cases, the portable computer may report the situation to the dispatch server, allowing the service provider to potentially dispatch an additional vehicle. Alternatively, the Dispatch Plan may select an Updated Dispatch Plan that minimizes any negative consequences. Once an updated Dispatch Plan has been developed, it is presented to the user for consideration in step 87 using the appropriate format.

Returning to the top of FIG. 6, the automatic updates are now considered. The Time Update 77 and the Location Update 78 operate in a similar manner as discussed previously, except that these inputs are typically periodically initiated automatically by the system. Thus, to return to the long-haul trucking application, the system may periodically (e.g., every 15 minutes) automatically perform a location-based update to the Dispatch Plan and present the status to the driver.

Other updates automatically received by the system are related to weather and traffic conditions. The Weather Data Update 75 may be based on commercial services offering electronic weather updates or a private service offered to the vehicle drivers. In any case, in step 80 the system ascertains the impact of the Weather Data Update. Typically, the Weather Data Update provides information that was unavailable when the initial dispatch plan was produced earlier in the day. Consequently, if unexpected weather develops in a certain location, such as rainstorms, snowfall, hail, etc., the impact of this information may be quantified and sent to the portable computer where predefined rules determine the impact. For example, a severe rainstorm may be quantified as adding a fixed time delay (e.g., 30 minutes) with respect to time in regard to the current schedule. Alternatively, the overall schedule may be delayed in proportion to completion of the Dispatch Plan (e.g., an extra 10 minutes for every remaining hour of work remaining).

Similarly, Traffic Data Update information 76 may be received by the system, which maybe provided by commercial services, local governmental transportation departments, or other sources. Similarly, information regarding closed roads, accidents, traffic jams, or other conditions may be quantified using predetermined rules. Typically, traffic information may be conveyed as having a location data and an indication of the traffic event. The location data may be a street or road identifier along with a block address or milemarker, or alternatively, the location data may be in the form of GPS coordinates. The indication of the traffic event may indicate a severity or a generalized delay factor. For example, it is not uncommon for traffic reports to characterize traffic conditions along certain routes has having as added amount of delay for certain commute times. Similarly, the impact of a traffic accident may be quantified as adding a certain amount of time overall to the anticipated delivery schedule. Once quantified, Traffic Data can be analyzed 81 to determine whether it poses a potential delivery problem or jeopardy situation relative to the uncompleted deliveries.

In other embodiments, Traffic Data updates may be processed by simply presenting graphical information to the delivery driver so as to allow the driver to select an alternate route to the destination, whether it be driving to a service stop or returning to the dispatch location. In this embodiment, no attempt is made to determine whether there is a need to update the Dispatch Plan, but simply inform the driver of traffic conditions so the driver may adjust their route accordingly. In this embodiment, the system may ascertain whether the location of the traffic incident is within the service area of the dispatch plan. The system would simply plot the location on graphical map using an indicia (e.g., icon) in conjunction with an indication of the event. This would be presented in graphical form to a user (e.g., a roadmap). In some embodiments, the user could manually toggle to displaying this information, so as to check the road status, while in other embodiments, the system could notify the user of a detected event and await user input to toggle the display into presenting the map. In still other embodiments, the impact of weather or traffic may be manually inputted into portable computer by the driver based on learning of the information through other channels (e.g., traffic radio reports).

Figure 7:
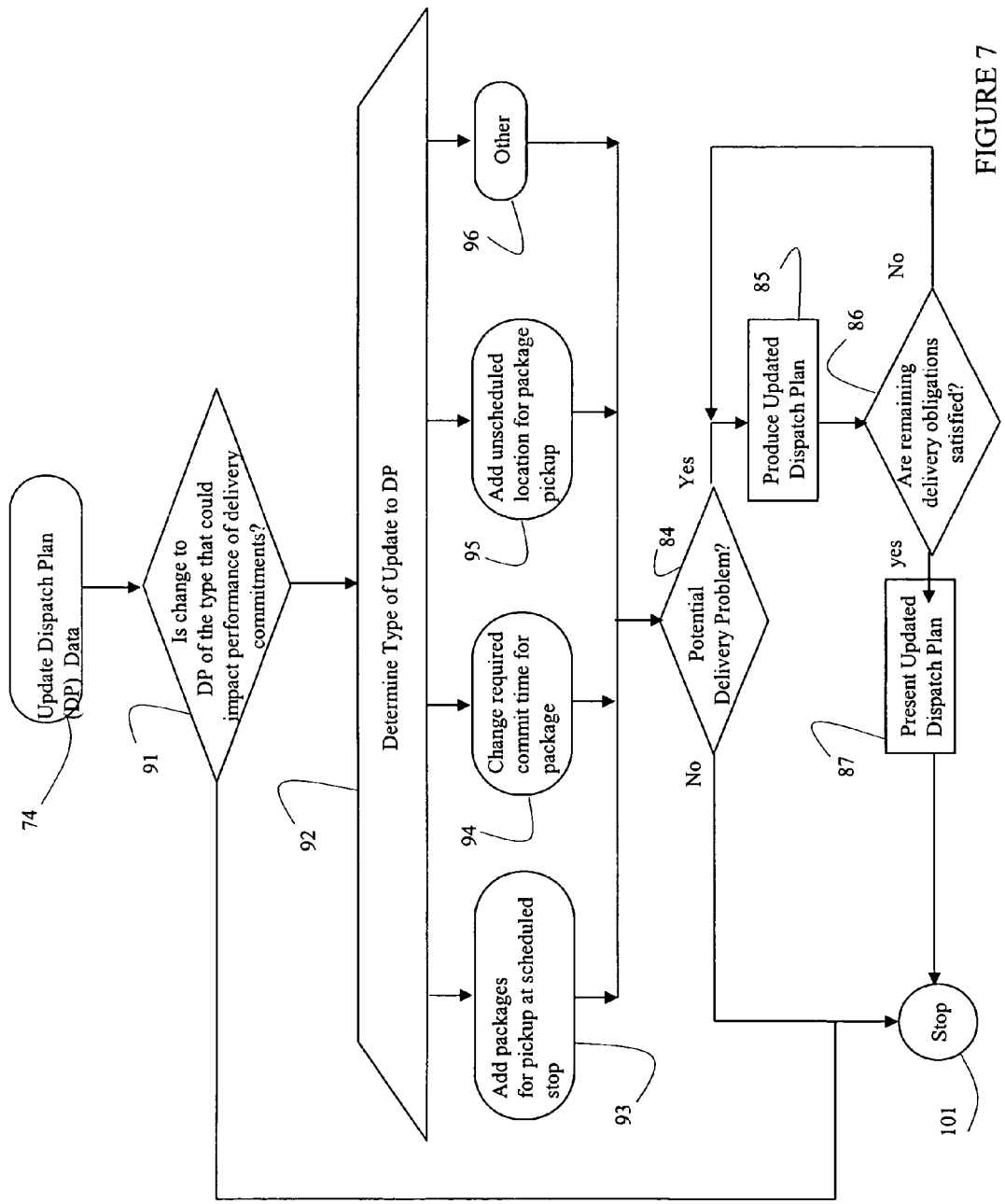
FIG. 7 illustrates one embodiment of various types of updates to a Manifest.

Finally, another type of automatic update received by the system that may impact the Dispatch Plan is indicated in step 74 of FIG. 6 with further details illustrated in FIG. 7. This input involves modifying the Dispatch Plan, or equivalently, modifying the Manifest. (Recall that the Dispatch Plan can be thought of at a high level as an ordered Manifest, so in this sense, they are similar). Turning to FIG. 7, the process of processing a change to the Dispatch Plan first tests whether the change is of the type that could impact performance of the delivery obligations 91. Certain type of Dispatch Plan Updates may not potentially affect the delivery obligations. For example, an update may correct a shipping address in the Dispatch Plan, reduce the number of parcels to be picked up, or cancel a pickup. These changes do not require additional time to execute the Dispatch Plan nor would require re-optimization of the records in the Dispatch Plan. These changes to the Dispatch Plan reduce the workload and advance, not delay, the delivery schedule. In such cases, the system proceeds to step 101 as there is no need to re-sequence the records in the Original Dispatch Plan.

Four types of common manifest updates are identified 92, although other classifications are possible. In the first case, the input comprises additional parcels for pickup 93. The parcels are associated with an existing scheduled service stop, but the number of parcels indicated by the customer for pick up is increased. Each parcel can be allocated a minimum handling time. Thus, a change to the Dispatch Plan in which the number of packages picked up is increased from two packages to fifty packages, would result in the system adding a minimum amount of time to the expected time for that schedule. The system could then examine any subsequent delivery schedules to see if there are adverse consequences. Further, the system could determine whether there is sufficient room to accept the packages, or whether other resources are required to service the stop.

Another type of Dispatch Plan Update shown at step 94 is changing the delivery commit time for a package. This would reflect a service in which the carrier allows the consignee to specify, or modify, a time window for performance of the service. In this case, the scheduled stops have not changed, but the delivery obligations associated with a stop has changed. In some instances, this may reflect that the consignee will not be present at the scheduled time or will be available after a certain time period. In residential deliveries, it is common that homeowners are unavailable during the workday or have temporarily gone.

Another type of Dispatch Plan Update is shown in step 95 where an unscheduled package pickup has been added to the schedule. This case may correspond to a customer providing a last minute request for a parcel pickup. This may be accomplished by the customer entering the data into a shipping system or calling the dispatch office requesting a pickup. Typically, a minimum amount of time is required to perform a pickup at an unscheduled location and the system can add this to the expected times associated with the service stops associated with the Dispatch Plan. In the case of adding an unscheduled pickup, the Original Dispatch Plan should be analyzed so as to avoid backtracking by the delivery vehicle, as well as analyzed so as to avoid missing a subsequent delivery commitment.

There may be other types of information that may update the Dispatch Plan 96, reflecting new services or capabilities, which may impact subsequent delivery obligations or otherwise trigger processing of the Original Dispatch Plan.

Returning back to FIG. 6, the remaining steps in FIG. 6, including ascertaining potential delivery problems 84, recalculating updating Dispatch Plan 85, ensuring the delivery criteria are satisfied 86 and presenting the updated dispatch plan to the operator 87 are similar as previously discussed.

Next, some of the data files used in the present invention are discussed. Those familiar with databases will recognize there are various techniques for structuring and linking data structures and database files. Consequently, the embodiments disclosed are but one approach, and other variations are readily possible.

Turning to FIG. 8, two different, but related, files are disclosed. One file is the Route Plan Data 117, which corresponds to the data contained in the GIS/Route Plan Database 43 of FIG. 4. The Route Plan data file 117 is a tabular file (e.g., text based comprising a sequence of records) of the various addresses or address groupings along a route of potential service stops. Not all addresses may necessarily have established shipping accounts with the parcel delivery service, as some addresses may only receive packages. As shown in FIG. 8, the data is illustrated as comprising a column for a record number 110 functioning as an index and name/address data 111. Thus, every potential address of a service stop can be listed along with the associated business or residential name. In this embodiment, the address is shown first, in order to illustrate the sequential nature of the route. Typically, the Route Plan Data is organized to reflect an optimal route and is determined in conjunction with several route plans for a plurality of delivery vehicles in a geographical serving area. In other embodiments, the route plan could be listed as address ranges, which greatly simplifies the storage requirements and the name is not stored either. This avoids having to update the route list every time an occupant moves.

The Historical Dispatch Plan Data 118 is shown as a separate tabular file in FIG. 8, for illustration purposes only. It could be implemented by appending additional columns to the Route Plan Data 117. In this embodiment, the Historical Dispatch Plan Data replicates the Record Number index 112 and address/name data 113 and appends a GPS Coordinate location data 114 and Average Arrival Time data 115. The GPS Coordinate location data typically indicates a longitude and latitude coordinate for each location, and the values illustrated in FIG. 8 are representative and may not necessarily reflect the precision available from current devices. For service stops in an urban environment that are relatively close to each other, the difference in location coordinates between stops is small, whereas for rural routes, the difference in location coordinates between stops is great. The historical location data does not vary over time (since address locations do not move), and once populated in the Historical Dispatch Plan Data 118, the location data is typically infrequently updated. The data may be separately recorded by the system upon completion of a service stop during the execution of a Dispatch Plan. In alternative embodiment, an area (e.g., a strip mall) may be represented by a single location and an algorithm may map the current location to the single location based on a defined distance margin (e.g., any location within 100 meters of the single location is associated with the strip mall).

The Average Arrival Time data, however, typically reflects a historical moving average of the arrival time for that location. Although every stop is typically not serviced on a route, whenever the stop is serviced, the arrival time can be noted and recorded. Thus, in the table 118, it is possible that two locations (e.g., 125 Main St. and 128 Main St. may have the same or similar average arrival times (e.g., 10:39 a.m.) even though they may not both be listed on a given days' Dispatch Plan. The average time may be based on service stops within the last 30 delivery days or some other value reflecting an average and/or seasonal value. In some embodiments, the values may be computed by reflecting an average based on the previous years' average for the same month. Since the average time may vary, a margin is defined so that a current time within a certain limit (e.g., 10 minutes) of an average time for that location is considered "on-time." Regardless of how the average arrival time is computed, the Historical Dispatch Plan Data provides a benchmark for comparing performance of a present Dispatch Plan with respect to past performance.

In other embodiments, such as when using address ranges, the Historical Dispatch Plan 118 may only store a few locations as benchmark locations. The benchmark location typically is a service stop associated with a frequently serviced customer, or a location signifying the last potential service stop in a defined area (e.g., last service stop on a street or in a subdivision). By using ranges, rather than individual address locations, the storage requirements are lessened. Only a small number of benchmark locations are required to be stored in memory in order to obtain an accurate estimation of a current performance of the Dispatch Plan.

Next, FIG. 9 illustrates one embodiment of the relationship of the Original Dispatch Plan 130 and the Manifest Data 131. For purposes of illustrating the principles of the present invention, two separate tables are used, but some embodiments may use only a single table. The Manifest Data file 131 is illustrated as a tabular file listing packages scheduled for pick-up or delivery. Since the packages are listed in order of the stops scheduled, the table 131 can also be considered as a variation of the Dispatch Plan. The contents of the Manifest Data 131 were previously discussed and are not discussed again.

Each package in the Manifest Data can be linked to a service stop in the Route Plan to produce the Original Dispatch Plan 130. This allows the Original Dispatch Plan to contain a subset of the information of the Manifest Data. Alternatively, the Manifest itself can be re-organized to reflect the order shown in the Original Dispatch Plan 130, and potentially indexed by address. Still alternatively, the Manifest may have a separate indicator in each record indicating its relative position in the Dispatch Plan. Those skilled in the art of database structures will readily perceive different implementations are possible. In still another embodiment, the Manifest can be logically viewed as a listing of packages for pickup or delivery, whereas the Dispatch Plan is a logical view of service stops and based on the Manifest.

As shown in FIG. 9, the two packages to be delivered to Perry's Pickle Shop 154a, 154b are linked to the third stop 150 in the Dispatch Plan. One of the packages, 154b is indicated in the Manifest as having a delivery commit time of 4:00 p.m.

The process creating the Original Dispatch Plan 130 typically occurs on a separate system in the central dispatch location and once determined, it is downloaded into the portable computer. There are various methods and approaches to producing the Original Dispatch Plan and the specific algorithms for producing the Original Dispatch Plan are not within the scope of the present invention. As presented, various embodiments are possible for the Dispatch Plan, including: a single table in the form of a sequentially ordered Manifest, a Manifest in which the logical sequence is indicated by appending a sequence number for each record, or a separately ordered Dispatch Plan comprising a sequence of addresses. Still another embodiment is illustrated in FIG. 9A.

Figure 9A:
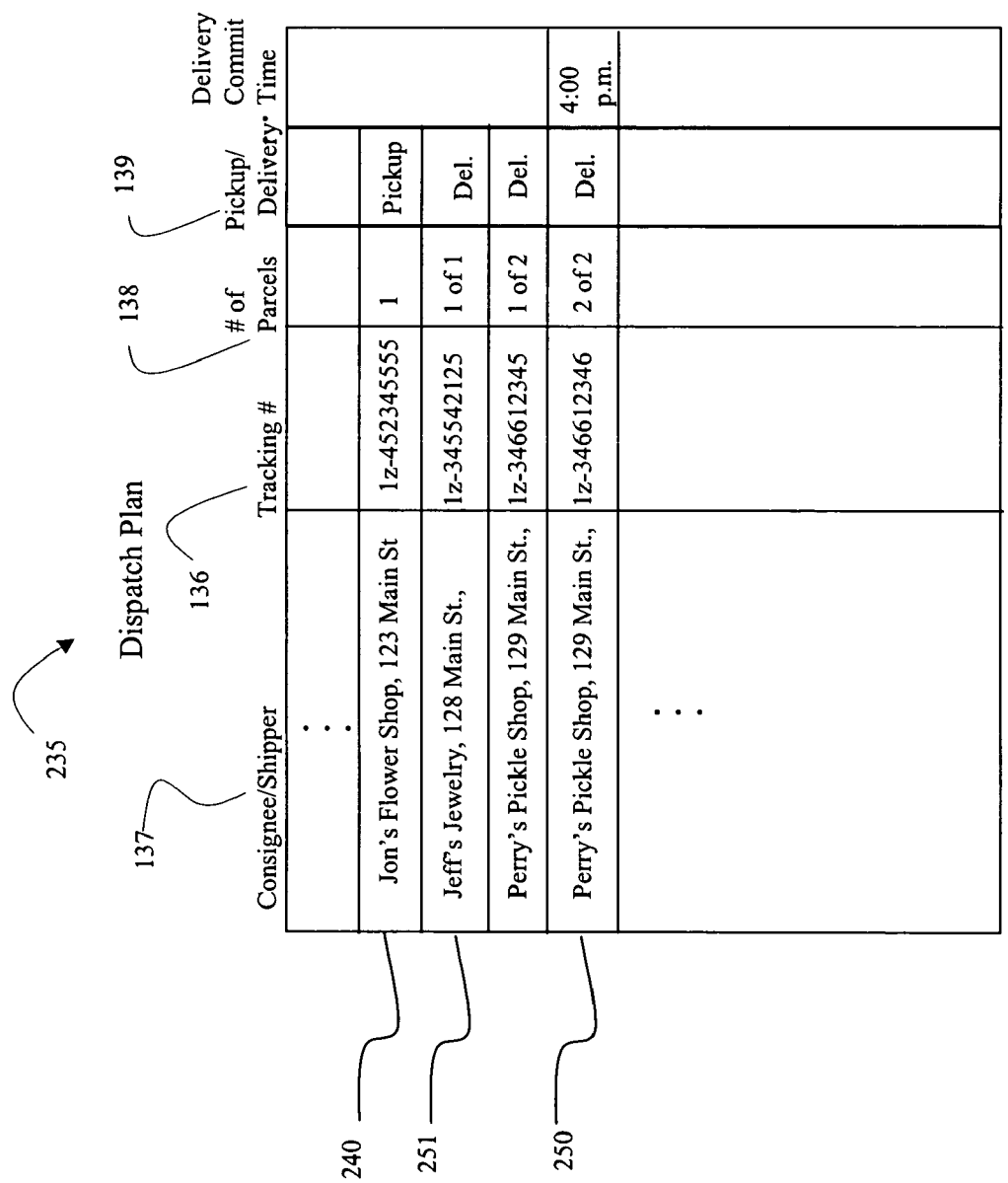
FIG. 9a illustrates another embodiment of a Dispatch Plan.

In FIG. 9A, a Dispatch Plan comprising a table 235 is illustrated in which the records are logically ordered based on the consignee address 137. Each address is associated with a package and therefore the record also contains the tracking number 136 and the number of parcels 138 to be delivered or picked up. The remaining fields present are the same as previously discussed with the Manifest of FIG. 9. In summary, the Manifest and Dispatch Plan can be represented in various ways, as an integrated table, or as separate tables. Any of the above representations, as well as other forms, are within the scope of the present invention.

Assuming that the format of the Original Dispatch Plan illustrated by FIG. 9a is loaded into the portable computing device, the Dispatch Manager of FIG. 4 receives the inputs and determines whether updating and re-sequencing of the Original Dispatch Plan is appropriate. To illustrate, consider a hypothetical Dispatch Plan similar to that illustrated in FIG. 1 involving a delivery vehicle scheduled to perform three service stops. In this example, a delivery commitment time of 4:00 p.m. is required for one of the packages.

Assume that the delivery vehicle has started on its service route, but that various conditions have been encountered causing a delay in the schedule. Notification of a severe traffic condition was received by the portable computer while the vehicle was en route executing the Dispatch Plan. The traffic condition update could have been received wirelessly, or the driver could have manually entered the information into the portable computer. The traffic condition update indicates a location and the portable computer determines this is within the service area of the Dispatch Plan. In this embodiment, the traffic conditions can be quantified to essentially add delay (e.g., advance the current time or expected time of arrival for each service stop).

The system is able to determine the delivery requirements (expected time) associated with the remaining service stops. The system identifies a potential delivery problem by determining that the delivery associated with the third stop to Perry's Pickle Shop 250 requires a 4:00 p.m. delivery commit time and will be jeopardized if the expected time of arrival were delayed by the aforementioned delay. In the Dispatch Plan, the order of the service stops are (in order):

1) Jon's Flower Shop 240,
2) Jeff's Jewelry Shop 251, and
3) Perry's Pickle Shop 250.

Given the current time and/or location, the system determines that servicing the locations as ordered in the Dispatch Plan 235 (namely stopping at Jeff's Jewelry 251 first and then Jon's Flower Shop 240 second) are likely to result in missing the 4:00 p.m. delivery commitment to Perry's Pickle Shop 250. The system determines that it is appropriate to invoke the algorithm to analyze the Dispatch Plan and the system re-orders the sequence of the dispatch plan to allow satisfaction of the delivery commit times. The Updated Dispatch Plan is shown in FIG. 10.

Figure 10:
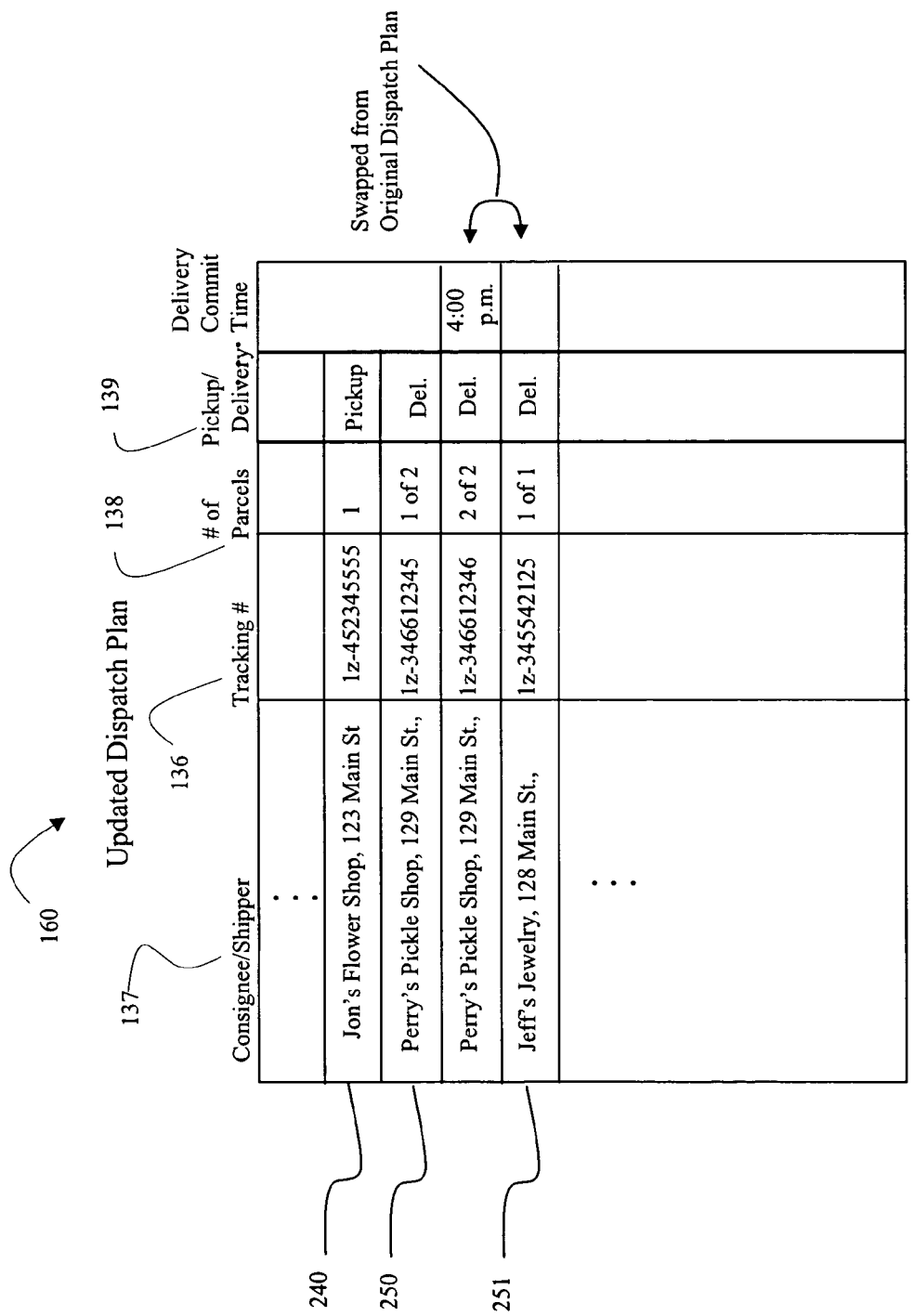
FIG. 10 illustrates one embodiment of an Updated Dispatch Plan.

In FIG. 10, the Updated Dispatch Plan 160 reflects the new order of delivery. Namely, Perry's Pickle Shop 251 is now the second stop, while the third stop is now Jeff's Jewelry 250. In this manner, the Updated Dispatch Plan is optimized reflecting an altered delivery plan satisfying the delivery criteria. FIG. 10 represents one form of tabular output of the dispatch plan that can be presented to the driver using the portable computing device.

Figure 10A:
FIG. 10a illustrates another embodiments of an Updated Dispatch Plan.

Another form of tabular output of the Dispatch Plan that can be presented to the user is shown in FIG. 10a. In FIG. 10a, the Updated Dispatch Plan 260 is presented to the user with a sequence of records 240, 250, 251, wherein the first column is a stop number indicator 261. The stop number represents the order of the stop, which is associated with the Address 262, and the recipient's name 263. Thus, each record corresponds to a service stop (e.g., address) as opposed to a package, which is the case with FIG. 9a. In FIG. 10a, a separate column 264 indicates the number of packages associated with the service stop, and the last column 265 indicates whether the service is a pick-up or delivery. This type of format emphasizes the order of the address locations to the driver, and a separate screen linking a stop to package level detail information can be embodied. This allows the driver to then link the address to specific packages.

As previously indicated, a graphical (e.g., map based) format of the Dispatch Plan could be presented as well. The system may display the Updated Dispatch Plan to the user in a graphical format (e.g., using a map) on the LCD display of the portable computing device (see, e.g., FIG. 12). The system may highlight the changes relative to the Original Dispatch Plan using different fonts, icons, flashing indicators, etc. The system may also identify any pertinent delivery requirements or other changes from the original dispatch plan. This can be accomplished by the user selecting an indication location corresponding to a service stop using a stylus, and the system responding by toggling the display to present the associated service stop information, and then reverting back to the display back to the dispatch plan.

When the system produces the Updated Dispatch Plan, the system may retain the previous version, so that the user may review the previous plans, not only to determine whether they are to be accepted, but to facilitate comparison so as to identify differences in the Dispatch Plans. Typically, this is only done when a change in the order of the records is performed. Other changes, such as modifying an existing record or adding a stop in which the order of records is preserved usually do not warrant the user signifying their acceptance.

Those skilled in the art of system design will appreciated that many variations are possible on the disclosed embodiments, including the various data structures, functional components, and hardware implementation aspects. Further, any process descriptions of blocks in flow charts should be understood as representing modules, segments, or portions of code which include one or more executable instructions for implementing specific logical functions or steps in the process, and alternate implementations are included within the scope of the present invention and that functions may involve additional functionality as understood by those skilled in the art of the present invention.

The system software, which comprises an ordered listing of steps, can be embodied in any computer-readable medium for use by, or in connection with, an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc (optical) read-only memory (CD-ROM).

In concluding the detailed description, it should be noted that many variations and modification can be made to the preferred embodiment without substantially departing from the principles of the present invention. Such variations and modifications are intended to be included herein within the scope of the present invention as set forth in the appended claims. Further, nothing in the specification is intended to limit the scope of the claims in any way beyond the claim language itself.

The invention claimed is:

1. A method for servicing a sequence of service stops using a service vehicle, the sequence of the service stops indicated by a logical sequence of records in a dispatch plan stored in a memory of a portable computing device, the method comprising executing a microprocessor located in the portable computing device to perform the steps of:

receiving update data wirelessly transmitted to the portable computing device, the update data comprising a first record associated with a service;

identifying address data in the first record and providing an indication that the address data is to be added to the dispatch plan;

retrieving at least a second record of the dispatch plan from the memory, wherein the second record comprises an address field associated with one of the sequence of the service stops;

comparing the address data in the first record with the address field associated with the second record;

determining a relative order of the first record with respect to the second record;

adding the first record to the dispatch plan based on the relative order;

identifying a subset of the records in the dispatch plan, wherein each record in the subset comprises a service completion flag indicating a respective service stop has not been performed;

identifying a service commitment in a record in the subset of records that is expected not to be performed by a required time based on a current time and at least a ratio of completed service stops relative to a total number of service stops;

reordering a logical sequence of the subset of the records, wherein the logical sequence of the subset of the records represents an order for performing the service stops of the subset of the records;

storing the logical sequence of the subset of the records in the memory to produce an updated dispatch plan;

notifying a driver of the service vehicle via the portable computing device of the production of the updated dispatch plan; and initiating viewing by the driver on a display controlled by the portable computing device of at least a portion of the updated dispatch plan, the portion of the updated dispatch plan including at least one address associated with one of the sequence of the service stops that has not yet been serviced.

2. A method for processing service-related update data directed to a dispatch plan in a portable computing device, the method comprising executing a microprocessor located in the portable computing device to perform the steps of:

receiving the service-related update data at the portable computing device, the service-related update data wirelessly transmitted to the portable computing device;

determining whether the service-related update data modifies a service commitment associated with a record of the dispatch plan;

determining whether the service commitment is likely to be met based on a comparison of a current value with an expected value, wherein the expected value is determined at least by calculating a ratio of completed service stops relative to a total number of service stops;

identifying address data within the service-related update data, wherein the address data is also contained in the dispatch plan;

identifying a first record in the dispatch plan from a memory in the portable computing device, the dispatch plan comprising a file of a sequence of records, wherein each record includes an address portion;

comparing the address data with the address portion associated with the first record in the dispatch plan;

determining that the address data matches the address portion of the first record;

modifying contents of the first record in the dispatch plan using the service-related update data;

storing the modified dispatch plan in the memory; and notifying a user of a modification of the dispatch plan;

wherein the current value comprises a current time and the expected value comprises an expected time, or the current value comprises a current location and the expected value comprises an expected location.

3. The method of claim 2, wherein the current value comprises a current time and the expected value comprises an expected time.

4. The method of claim 3, wherein the expected time is further determined by identifying both a first number of records in the dispatch plan having a completion flag set with a first value and a second number of records in the dispatch plan having the completion flag set with a second value.

5. The method of claim 2, wherein a current value comprises a current location and the expected value comprises an expected location.

6. The method of claim 5, wherein the expected location is further determined by using historical data.

7. The method of claim 5, wherein an order of the records in the dispatch plan is logically re-sequenced based on the service commitment.

8. A method of triggering a process of updating a dispatch plan, the method comprising executing a microprocessor located in a portable computing device to perform the steps of:

receiving wirelessly transmitted dispatch update data at the portable computing device, the dispatch update data comprising service-related data and a first address location;

identifying a first record in the dispatch plan from a memory in the portable computing device, wherein the dispatch plan comprises an ordered sequence of records and wherein each record in the ordered sequence of records comprises an address portion;

determining the address portion of the first record matches the first address location;

updating the first record using the service-related data;

identifying a first set of records in the dispatch plan wherein each record in the first set of records comprises a service completion flag indicating a service stop has not yet been completed;

examining the first set of records to determine whether completion of a service commitment associated with one of the records is impacted based on at least a ratio of completed service stops relative to a total number of service stops;

triggering the process of updating the dispatch plan resulting in reordering the records in the first set of records to produce an updated dispatch plan;

storing the updated dispatch plan in the memory in the portable computing device; and notifying a user of the portable computing device of the production of the updated dispatch plan.

9. The method of claim 8 further comprising the step of:

displaying the updated dispatch plan to the user using a text-based presentation of at least a portion of the records in the updated dispatch plan, the portion of the records in the updated dispatch plan including text associated with the service-related data.

10. A system for processing dispatch plan data conveyed in a service delivery vehicle comprising:

a memory storing a dispatch plan comprising a logical sequence of records, each record comprising an address portion, a service completion flag, and package identification data;

a wireless interface capable of receiving a dispatch plan update message and storing the dispatch plan update message in the memory, the dispatch plan update message modifying a first record in the dispatch plan, the dispatch plan update message indicating either a first address or a first package identification data;

a processor configured to:
identify the first record in the dispatch plan;
use the dispatch plan update message to produce a modified first record;
store the modified first record in the dispatch plan;
generate a first set of display signals based on the modified first record;
periodically obtain a current time data and determine a current dispatch plan schedule status based on the current time data and an expected time, wherein the expected time is determined at least by calculating a ratio of completed service stops relative to a total number of service stops; and provide a second set of display signals indicating the current dispatch plan schedule status to a display; and the display capable of receiving the first set of display signals and the second set of display signals, and presenting, to a driver of the service delivery vehicle, the dispatch plan update message, including one of the first address or the first package identification data.

11. The system of claim 10, wherein the processor is further configured to periodically obtain location data from a GPS module and to process the location data to determine the current dispatch plan schedule status using in part historical location data associated with the records in the dispatch plan.

* * * * *

UNITED STATES PATENT AND TRADEMARK OFFICE
CERTIFICATE OF CORRECTION

PATENT NO.      : 7,624,024 B2                          Page 1 of 1
APPLICATION NO. : 11/108994
DATED           : November 24, 2009
INVENTOR(S)     : Levis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1255 days.

Signed and Sealed this

Twenty-sixth Day of October, 2010

David J. Kappos
*Director of the United States Patent and Trademark Office*